(12) United States Patent
Horner et al.

(10) Patent No.: US 12,005,968 B2
(45) Date of Patent: Jun. 11, 2024

(54) ARTICULATING TAILGATE

(71) Applicant: Magna Exteriors Inc., Concord (CA)

(72) Inventors: Robert M. Horner, Ferndale, MI (US); Larry R. Erickson, Birmingham, MI (US); Robert A. Selle, Rochester, MI (US); Peter G. DeMarois, Troy, MI (US); Michael S. Spagnuolo, Shelby Township, MI (US); Andrew E. Sicherman, Royal Oak, MI (US); Brian Staley, Bloomfield, MI (US)

(73) Assignee: Magna Exteriors Inc., Aurora (CA)

( * ) Notice: Subject to any disclaimer, the term of this patent is extended or adjusted under 35 U.S.C. 154(b) by 50 days.

(21) Appl. No.: 17/535,041

(22) Filed: Nov. 24, 2021

(65) Prior Publication Data

US 2022/0161870 A1 May 26, 2022

Related U.S. Application Data

(60) Provisional application No. 63/118,454, filed on Nov. 25, 2020.

(51) Int. Cl.
*B62D 33/027* (2006.01)
*B60J 5/10* (2006.01)
(Continued)

(52) U.S. Cl.
CPC .......... *B62D 33/0273* (2013.01); *B60J 5/108* (2013.01); *B60Q 1/307* (2013.01); *B60Q 1/323* (2013.01); *B60Q 1/44* (2013.01); *B60R 3/02* (2013.01)

(58) Field of Classification Search
CPC ................ B62D 33/023; B62D 33/027; B62D 33/0273; B62D 33/037; B60J 5/10;
(Continued)

(56) References Cited

U.S. PATENT DOCUMENTS 3,785,695 A * 1/1974 Conkle .................. B62D 33/08
296/50
4,750,777 A * 6/1988 Brammer ........... B62D 33/0273
296/50

(Continued)

FOREIGN PATENT DOCUMENTS

DE 102004050228 * 4/2006 ................ B60J 5/12
DE 102011116174 * 4/2013 ................ B60J 5/12
FR 2915140 A1 10/2008

OTHER PUBLICATIONS

Canadian Office Action Examination Search Report for Application No. 3, 140,299 dated Jan. 25, 2024, 2-pages.

*Primary Examiner* — Gregory A Blankenship
(74) *Attorney, Agent, or Firm* — Warn Partners, P.C.

(57) ABSTRACT

A tailgate assembly including at least two tailgate panels that both move between a closed position, a plurality of intermediate open positions, and a fully open position, where the tailgate panels selectively separate and articulate from the back of the cargo bed to the sides of the cargo bed. The tailgate panels move out of the way to provide direct access to the cargo area floor. The tailgate panels articulate in a small envelope of space, improving access to the rear in a confined space at the rear of the vehicle and reducing the risk of contacting objects that may be behind the vehicle.

21 Claims, 41 Drawing Sheets

(51) Int. Cl.
  *B60Q 1/30* (2006.01)
  *B60Q 1/32* (2006.01)
  *B60Q 1/44* (2006.01)
  *B60R 3/02* (2006.01)
  *B62D 33/037* (2006.01)

(58) Field of Classification Search
  CPC .. B60J 5/108; B60J 5/12; B60Q 1/323; B60Q 1/324; B60Q 2400/50
  See application file for complete search history.

(56) References Cited

U.S. PATENT DOCUMENTS

| | | | | |
|---|---|---|---|---|
| 5,523,926 | A * | 6/1996 | Gold | B60Q 1/30 |
| | | | | 340/472 |
| 5,685,594 | A * | 11/1997 | Harper | B62D 33/0273 |
| | | | | 296/57.1 |
| 6,184,786 | B1 * | 2/2001 | Medeiros | B60Q 1/2611 |
| | | | | 340/471 |
| 9,434,317 | B2 * | 9/2016 | Nania | B60R 3/02 |
| 9,561,749 | B2 * | 2/2017 | Heaman | B60Q 3/30 |
| 9,956,995 | B1 * | 5/2018 | Neighbors | B62D 33/0273 |
| 11,608,960 | B1 * | 3/2023 | Schellens | F21V 23/0492 |
| 2004/0130902 | A1 * | 7/2004 | Snyder | B60Q 3/30 |
| | | | | 362/540 |
| 2008/0106106 | A1 * | 5/2008 | Lavoie | B60R 3/02 |
| | | | | 293/117 |
| 2009/0284036 | A1 * | 11/2009 | Clayton | B60P 3/40 |
| | | | | 296/26.09 |
| 2018/0086392 | A1 * | 3/2018 | Seki | B62D 33/0273 |
| 2018/0126830 | A1 * | 5/2018 | Lampsa | B60J 5/108 |
| 2018/0290598 | A1 * | 10/2018 | Khalid | B60R 5/04 |
| 2019/0301223 | A1 * | 10/2019 | Ihrke | E05F 5/025 |
| 2021/0253180 | A1 * | 8/2021 | Selle | B62D 33/0273 |
| 2021/0387680 | A1 * | 12/2021 | Parker | B60J 5/12 |
| 2022/0065020 | A1 * | 3/2022 | Carter | B60Q 3/30 |
| 2022/0119045 | A1 * | 4/2022 | Horner | B62D 33/027 |
| 2022/0161870 | A1 * | 5/2022 | Horner | B60R 3/02 |
| 2022/0170301 | A1 * | 6/2022 | Lampsa | E05D 3/125 |
| 2022/0289312 | A1 * | 9/2022 | Aquila | B60R 5/02 |
| 2022/0314888 | A1 * | 10/2022 | Glickman | B60D 1/01 |
| 2022/0388578 | A1 * | 12/2022 | Gill | B62D 33/0273 |
| 2023/0046429 | A1 * | 2/2023 | Go | B62D 33/037 |

* cited by examiner

ARTICULATING TAILGATE

CROSS-REFERENCE TO RELATED APPLICATIONS

This application claims the benefit of U.S. Provisional Application No. 63/118,454, filed Nov. 25, 2020. The disclosures of the above application are incorporated herein by reference.

FIELD OF THE INVENTION

The present invention relates to articulating cargo bed tailgate panels.

BACKGROUND OF THE INVENTION

Access to the cargo box of a pick-up vehicle is difficult with the tailgate blocking direct access to the cargo area or is prohibiting access by confining the access path between opened tailgate doors or panels. Access is difficult when there is limited space behind the vehicle and the potential for contact with nearby objects is greater with an opened tailgate. Known tailgate panels separate and articulate from the back of the cargo bed to the side of the cargo bed.

An objective of the present invention is to reduce the access distance at the rear of the cargo bed of a pickup truck or any vehicle with a tailgate and eliminate any confined access path to the bed. Reduce the opening envelope behind the vehicle to improve access in a confined space and to avoid hitting nearby objects.

There is desired the reducing of the access distance at the rear of the cargo bed and eliminate any confined access path to the bed, and to reduce the opening envelope behind the vehicle to improve access in a confined space and to avoid hitting nearby objects.

SUMMARY OF THE INVENTION

In accordance with the present invention, there is provided tailgate panels that move out of the way to provide direct access to a cargo area floor of the vehicle and allows a person to approach the cargo bed from not only the rear of the vehicle but from the sides as well. Deployable or fixed steps integrated into the rear of the vehicle assist in the ingress and egress of a person to the cargo bed, in accordance with aspects of the present invention. The tailgate panels close off the rear opening to the back of the cargo bed, and also selectively separate and articulate from the back of the cargo bed to the side of the cargo bed. The panels move out of the way to provide direct access to the cargo area.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
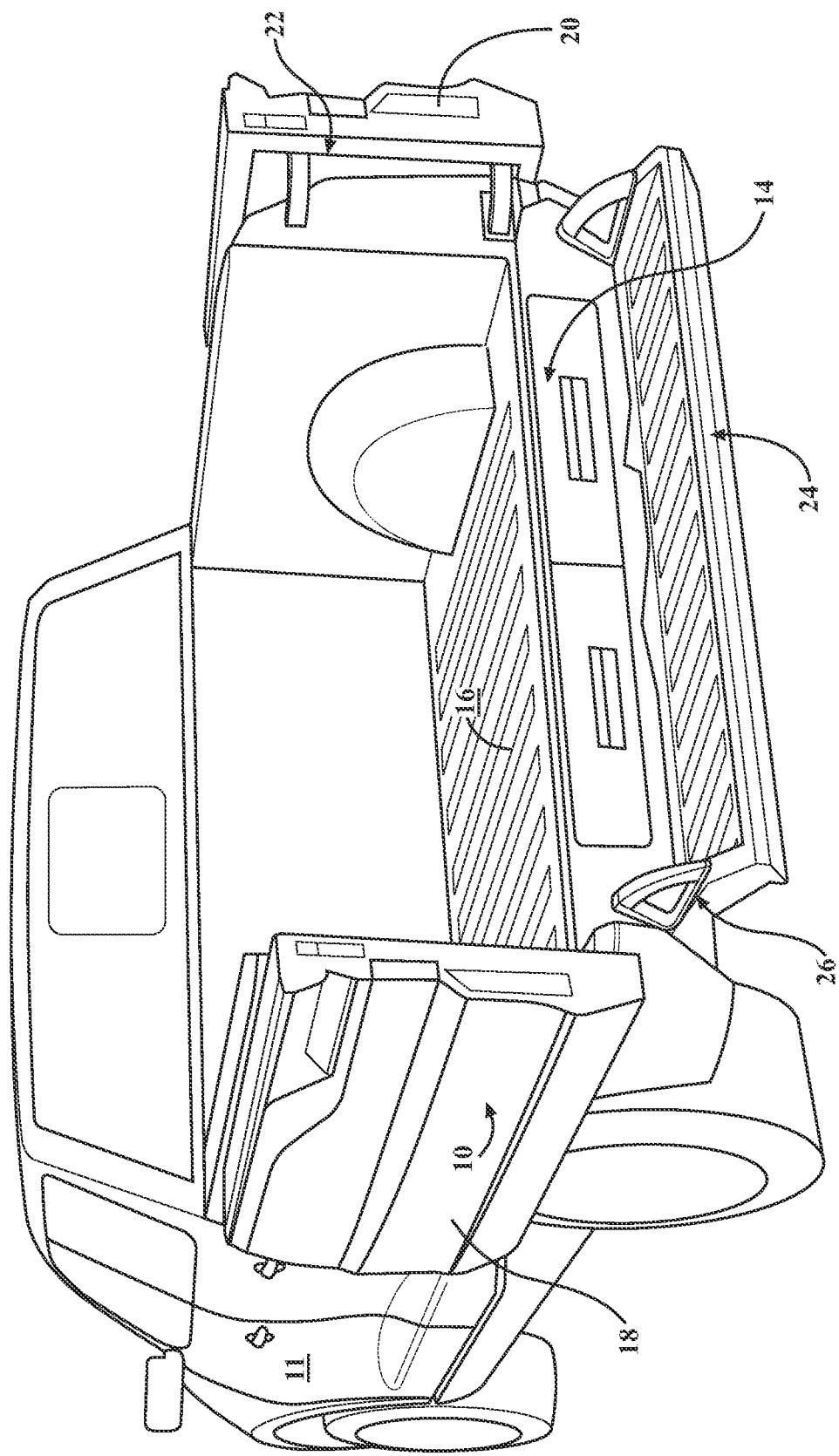
FIG. 1 depicts an articulating tailgate assembly in an open position, in accordance with the present invention.
Figure 2:
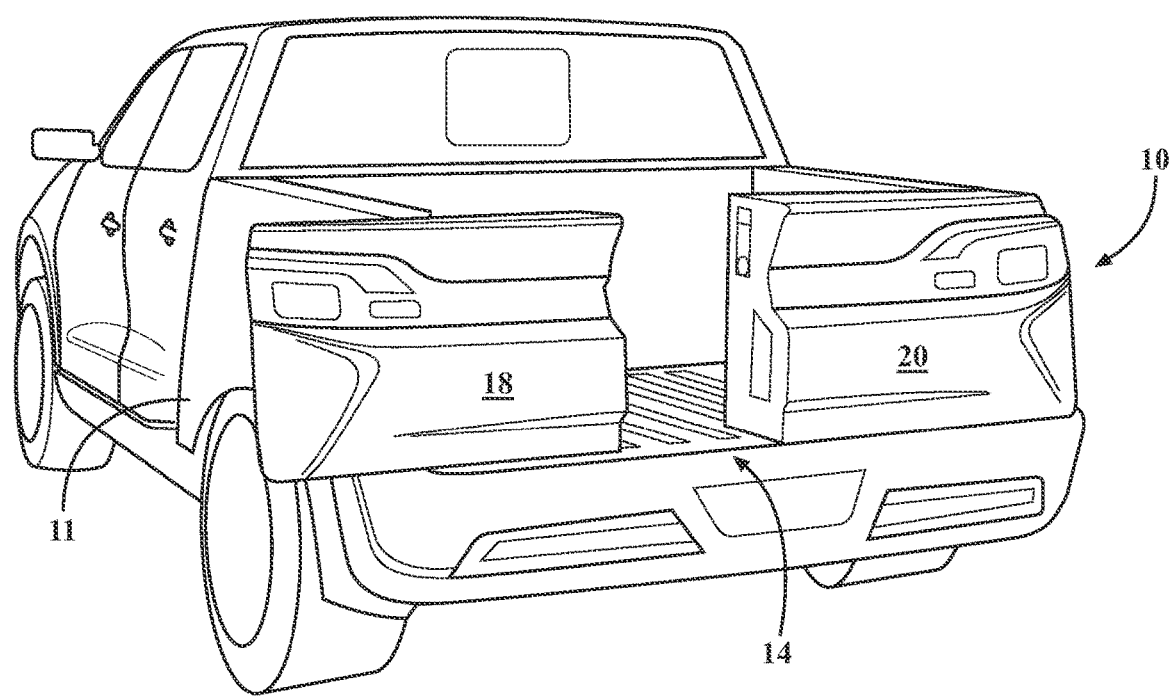
FIGS. 2-5 depict an articulation sequence of the articulating tailgate assembly to open intermediate positions and a fully open position, in accordance with aspects of the present invention.
Figure 3:
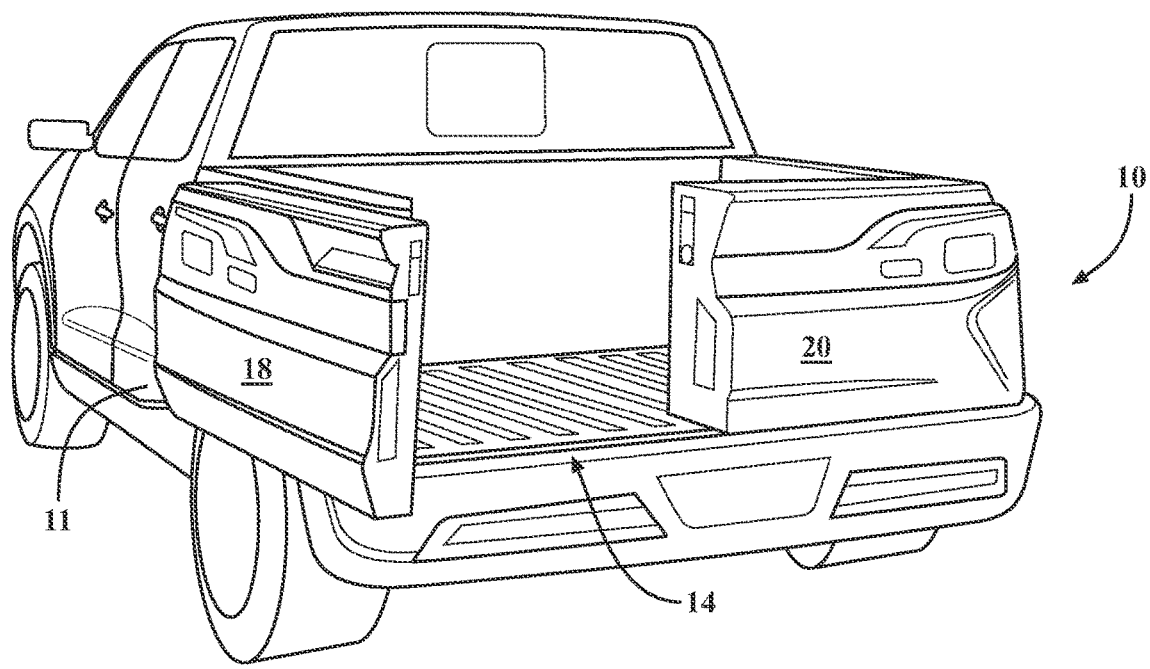
Figure 4:
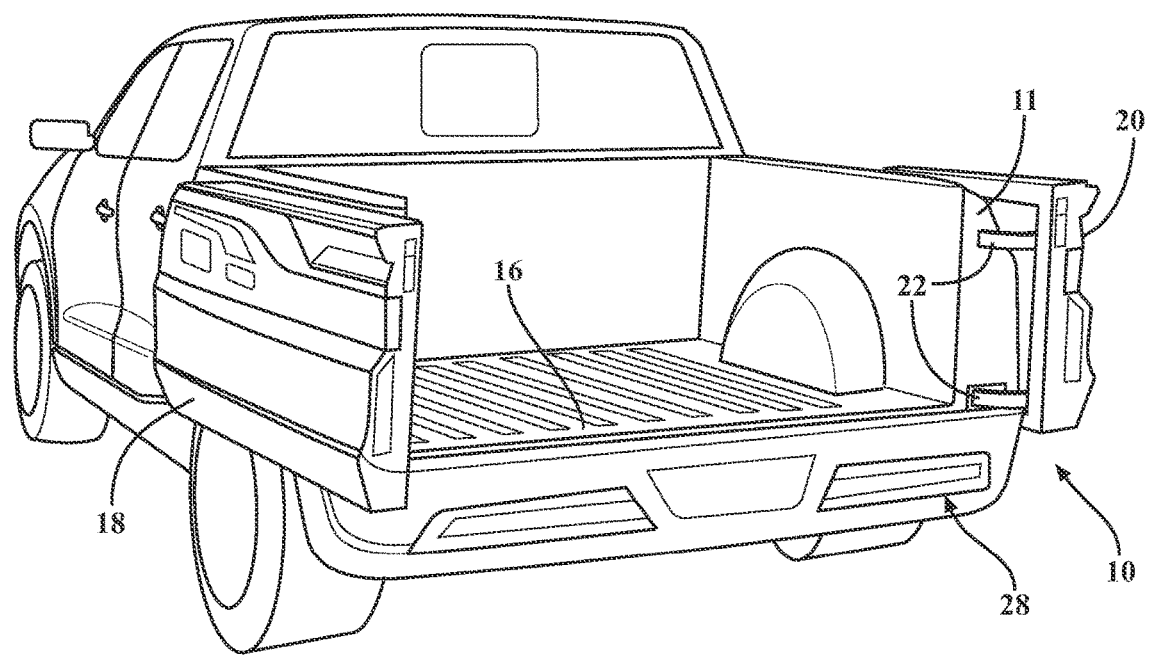
Figure 5:
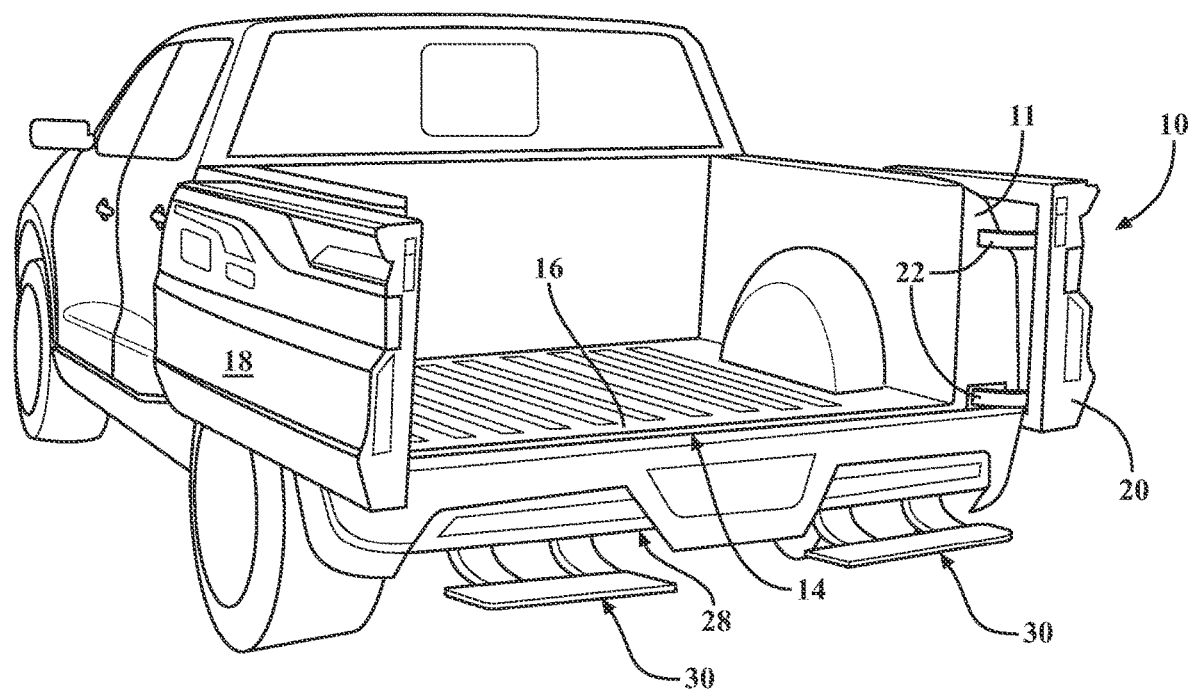
Figure 55:
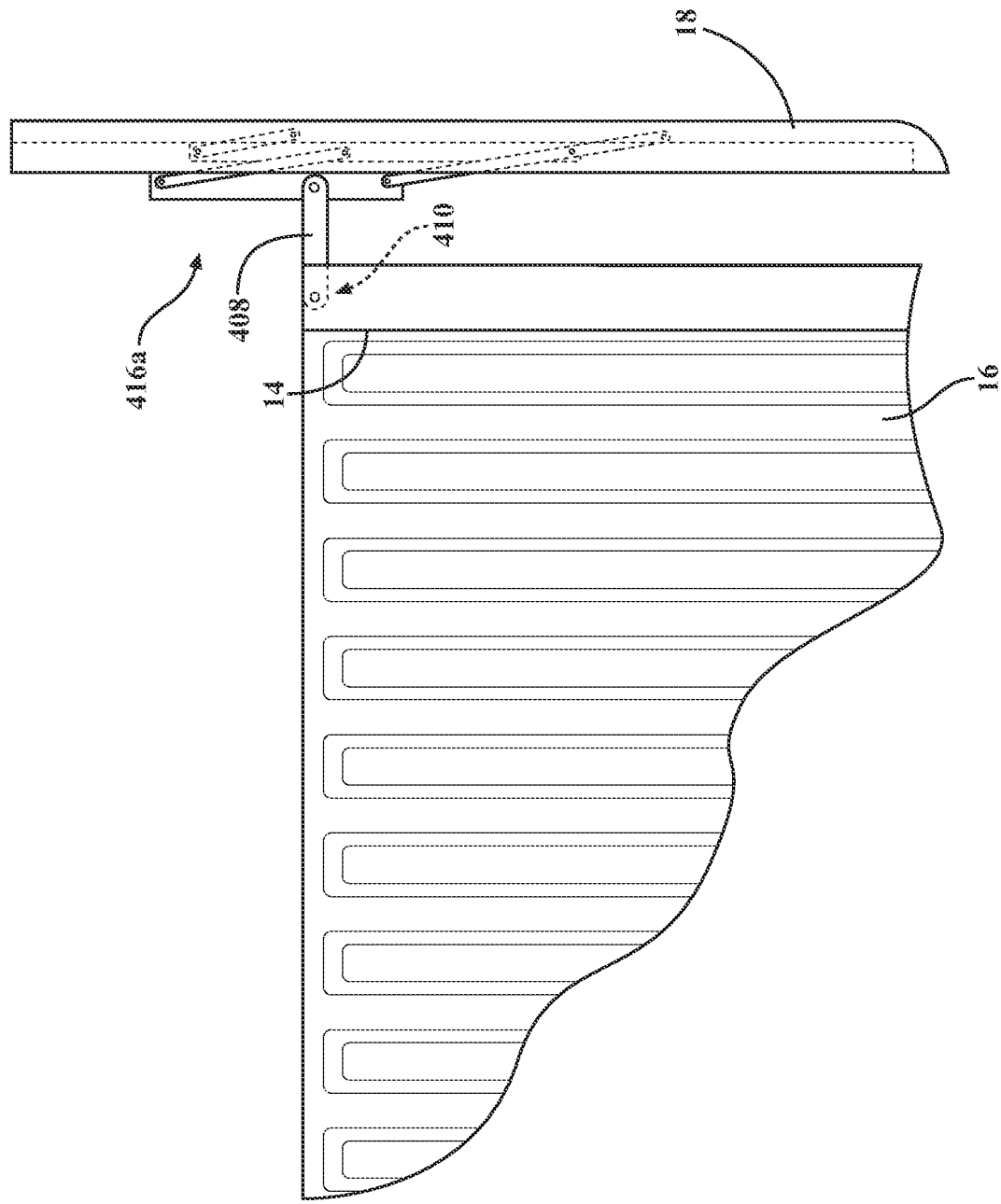

Referring to FIGS. 1-55 generally, the present invention provides tailgate panels that articulate from the rear of the vehicle to the sides of the vehicle. There is provided an articulating tailgate including a plurality of tailgate panels that articulate from a rear of the vehicle to sides of the vehicle. According to aspects of the present invention, there is included a plurality of integrated lights to illuminate or direct light to predetermined location(s) and direction(s), e.g., a cargo bed interior, the ground, and/or the side of the vehicle, etc. According to aspects of the present invention, there is included a plurality of integrated tail lamps into at least one panel end to act as stop lamps when the panels are in an open state. According to aspects of the present invention, there is included at least one drop down step in the rear of the vehicle to assist in ingress and egress of the carbo bed.

According to aspects of the present invention, there is included at least one drop down shelf in the rear of the vehicle with a stepping surface to assist in ingress and egress of the carbo bed as well as a workstation or temporary storage shelf. In accordance with the present invention, the plurality of tailgate panels articulate in a small envelope of space improving access to the rear in a confined space at the rear of the vehicle In accordance with the present invention, the tailgate panels articulate in a small envelope reducing the risk of contacting objects behind the vehicle.

The tailgate panels are operably adapted to articulate from the rear to the outer sides of the vehicle, e.g., manually moved, electric, driven, switch, key fob, sensor(s), actuator (s), drive screw(s), any suitable articulation, and combinations thereof. Preferably, moved manually as assisted by the plurality of features to articulate the panels between the closed and any number of open positions. The at least two panels of the liftgate each of a generally vertical edge that meet up and, preferably, are operably secured together in the closed position.

Referring to FIGS. 1-55 generally, and more particularly to FIGS. 1-5, there is depicted an articulating tailgate shown generally at 10, in accordance with the present invention. The articulating tailgate 10 is operably coupled to the vehicle 11, preferably, a pickup truck, but it is understood that the present invention is adaptable for other vehicles depending on the application without departure from the scope of the present invention. The articulating tailgate 10 is adapted to operably connect to the vehicle and selectively close off or provide at least one opening 14 into the cargo bed 16 of the vehicle. The assembly includes tailgate panels that selectively articulate from the rear of the vehicle 11 (closing off the opening 14) to the sides of the vehicle, e.g., independently to the respective side to create at least partial opening to the right or left at the rear of the vehicle or fully open at the rear of the vehicle.

Preferably, at least a first panel 18 (e.g., left door panel) and second panel 20 (e.g., right door panel) are provided to selectively open at the rear of the vehicle to one side or both rear sides of the vehicle, thereby selectively adjusting the width of the opening 14 for access to the cargo bed 16 from the rear. At least one articulating assembly 22 mechanism is provided on each panel 18 and 20 to move the panels 18,20 between open and closed positions, e.g., selected by swing and/or slide articulating features, tracks, rails, guide feature(s), hinge(s), linkage assemblies(s), link(s), pins, hinge pins, pivot joints, at least one embedded track, at least one connected track, at least one external track, and any combinations thereof between closed position, intermediate open positions, and fully open position.

Preferably, each articulating mechanism 22 is at least one hinge 22, most preferably a pair of hinges, (e.g., a first hinge, second hinge, upper hinge and/or lower hinge) on each respective panel 18 and 20. The hinge(es) 22 are operably adapted to connect to the vehicle 11 and rotate the panels 18 and 20 between the closed position closing off the cargo bed 16 opening 14 and at least one open position (e.g. any number of intermediate opening locations and fully open position). For increased access into the cargo bed, because a closed or dropped tailgate is not in the way interfering with an operator's reach, the first and second panel 18 and 20 are selectively opened to the sides of the vehicle, respectively. Therefore, the present invention reduces the access distance at the rear of the cargo bed and eliminates any confined access path to the bed, and reduces the opening envelope behind the vehicle to improve access in a confined space and to avoid hitting near by objects.

The assembly 10 may additionally incorporate at least one drawer assessable once at least one panel 18,20 is moved to the open position, and/or at least one elongated stepping and work shelf surface, and/or at least one pair of steps where each is independently selectively deployable or deployable simultaneously, and/or at least one step lighting adapted for directing light a predetermined distance and direction(s), depending on the particular applications.

The tailgate panels 18,20 separate and articulate generally from the back of the cargo bed 16 to generally the respective outer side of sidewalls 17 of the cargo bed 16. The panels 18,20 move out of the way to provide direct access to the cargo area floor and allows an operator to approach the cargo bed from not only the rear of the vehicle but from the sides as well.

At least one deployable step 24 and/or 30 or fixed step is integrated into the rear of the vehicle to assist in the ingress and egress of a person to the cargo bed, in accordance with aspects of the present invention. At least one articulating feature 26 (e.g., hinge) is operably adapted to couple to the vehicle to selectively rotate at least one step 24 between a deployed position and stored position. The step 24, and either or both panels 18,20 is selectively manually or electrically deployed, e.g., switch, etc. In accordance with aspects of the present invention, at least one lighting device 28 is provided in at least one predetermined location to illuminate predetermined vehicle parts, cargo bed floor, and/or sides of the vehicle, and/or ground surfaces with operably directed light (e.g., on the tailgate, articulating feature 26, step 24, individual drop down step(s) 30, incorporated into panels 18,20, rear structure, etc.)

According to aspects of the present invention, the operably articulating tailgate 10 provides a plurality of combination of features, preferably all, including: Tailgate panels that articulate from the rear of the vehicle to the sides of the vehicle; Integrated lights to illuminate the bed interior, the ground and the side of the vehicle; Integrated tail lamps into the panel end to act as stop lamps when the panels are in the open state; at least one drop down step(s) in the rear of the vehicle to assist in the ingress and egress of the carbo bed; the panels articulate in a small envelope improving access to the rear in a confined space at the rear of the vehicle; The panels articulate in a small envelope reducing the risk of contacting objects behind the vehicle.

Referring now more particularly to FIGS. 2-5, there is depicted an exemplary articulation sequence to open intermediate positions and the open position.

Figure 6:
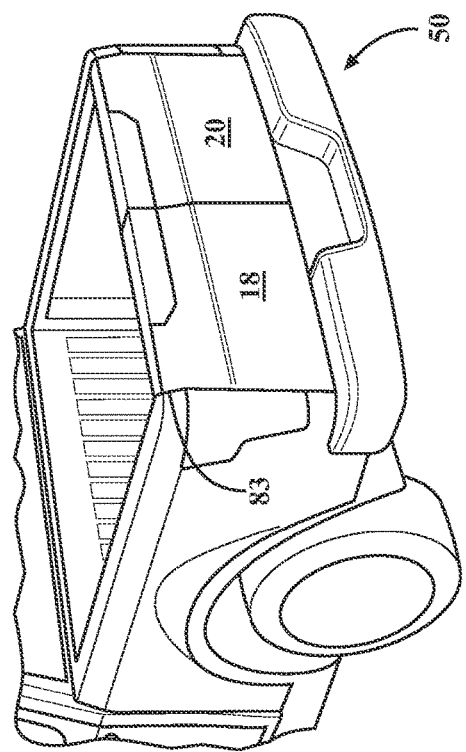
FIGS. 6-7 depict an exemplary standard width articulating tailgate assembly, in accordance with aspects of the present invention.
Figure 7:
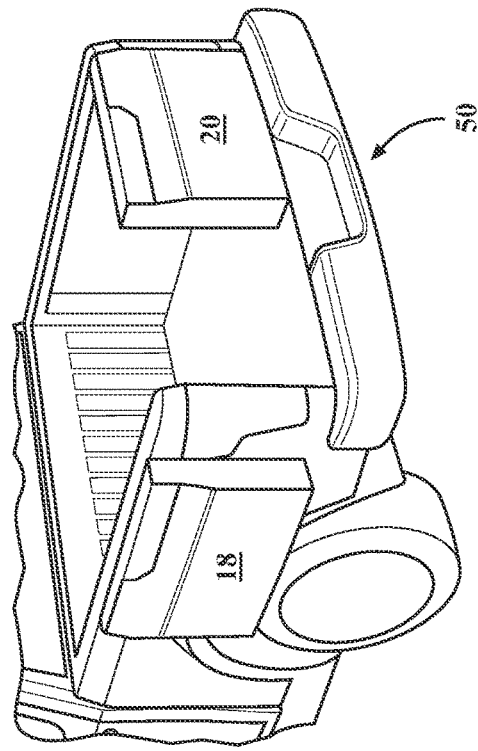

Referring to FIGS. 1-55 generally, and more particularly to FIGS. 6-7, there is depicted an exemplary standard width articulating tailgate assembly indicated generally at 50 with a first and second panel 18,20. A leading edge 83 of the panels 18,20 is adapted to generally stop substantially inboard of respective corresponding ends of sidewalls 17 of the cargo bed 16 of the vehicle 11, preferably, including no taillight portion. It is understood that any aspects of the present invention are incorporable with any standard width tailgates depending on the particular application without departure from the scope of the present invention.

Figure 8:
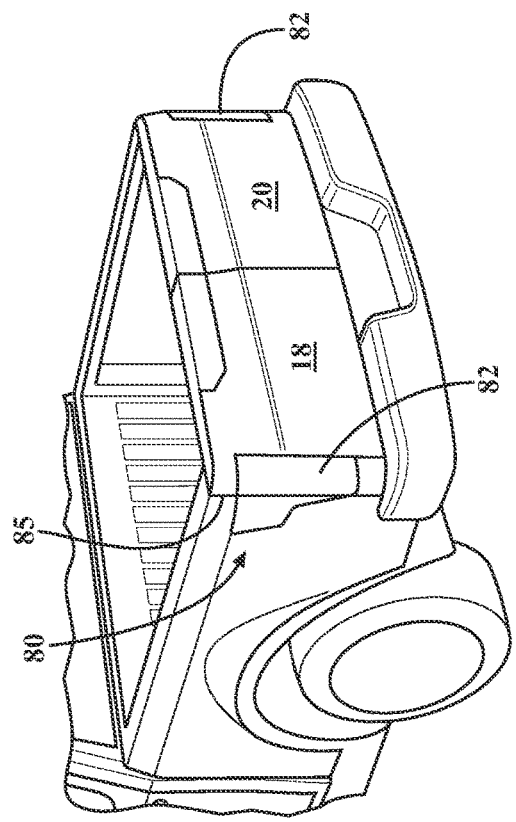
FIGS. 8-9 depict an exemplary extended width articulating tailgate assembly, in accordance with aspects of the present invention.
Figure 9:
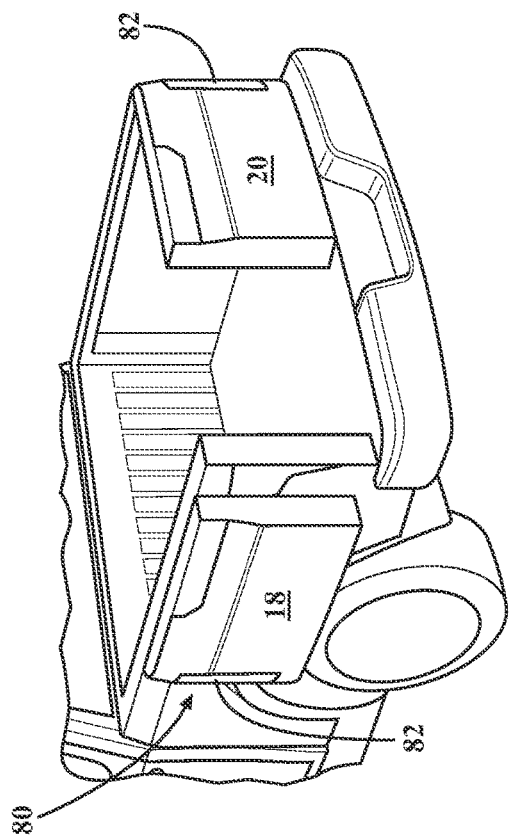

Referring to FIGS. 1-55 generally, and more particularly to FIGS. 8-9, there is depicted an exemplary extended width articulating tailgate assembly indicated generally at 80. A leading edge 85 of the panels 18,20 is adapted to generally at least partially overlap the plane of the ends of sidewalls of the cargo bed of the vehicle 11. At least a portion of a taillight 82 (e.g., at least a part of a lens of the taillight) can be incorporated in the articulating tailgate panels 18,20, traveling therewith when articulating the tailgate panel 18 between closed and open positions, in accordance with aspects of the present invention. It is understood that any aspects of the present invention are incorporable with any extended width tailgates depending on the particular application without departure from the scope of the present invention.

Referring now more particularly to FIGS. 10-16, there is depicted an articulating tailgate assembly indicated generally at 100 incorporating at least one cargo door track mechanism for opening each panel 18,20 to the sides of the vehicle 11, in accordance with the present invention. While the first panel 18 and corresponding structures are illustrated, it is understood that the second panel 20 and corresponding structures are substantially identical.

The assembly 100 includes at least one link 102 connected to the first panel 18 and connected to a guide 104. The guide 104 is operably moved along (e.g., slide on or within) at least one track 106. Each guide 104 is adapted to operably slide along the track 106, which comprises at least a first track portion 108 along the rear of the vehicle cargo bed area, operably navigates the track corner, indicate generally at 109, and slides along at least one second track portion 110 adjacent the side of the vehicle. Each link 102 is rotatably coupled to the first panel 18 at pivot joint 112. Each link 102 is also rotatably coupled to the respective guide 104 at second pivot joint 114. Preferably, at least on pair of links 102,102 is pivotably connected to at least one pair of guides 104,104. In addition, each pair of links 102,102 pivotably connected to the first panel 18 at a predetermined distance apart (indicated as in FIG. 13). The height of the links 102 (indicated as 'H' in FIG. 13) is any predetermined height suitable for moving the first panel 18 between closed and open positions along the track 106 while preventing part binding (making the panel difficult to move between positions) and contact to vehicle body damage.

It is understood that any predetermined attachment locations to the first panel 18 and any predetermined distance between links 102 and 102 is contemplated without departure from the scope of the present invention. It is further understood that the track 106 can be a lower or upper track or a combination of both and operably incorporate the corresponding features. The tracks can be incorporated, embedded, or connected to the cargo bed walls, floor, exterior, interior, rear, bumper, inward surface of the panels 18,20, any other area suitable for moving the panels 18,20 from the rear of the vehicle to the sides of the vehicle, and any combinations thereof.

Figure 15:
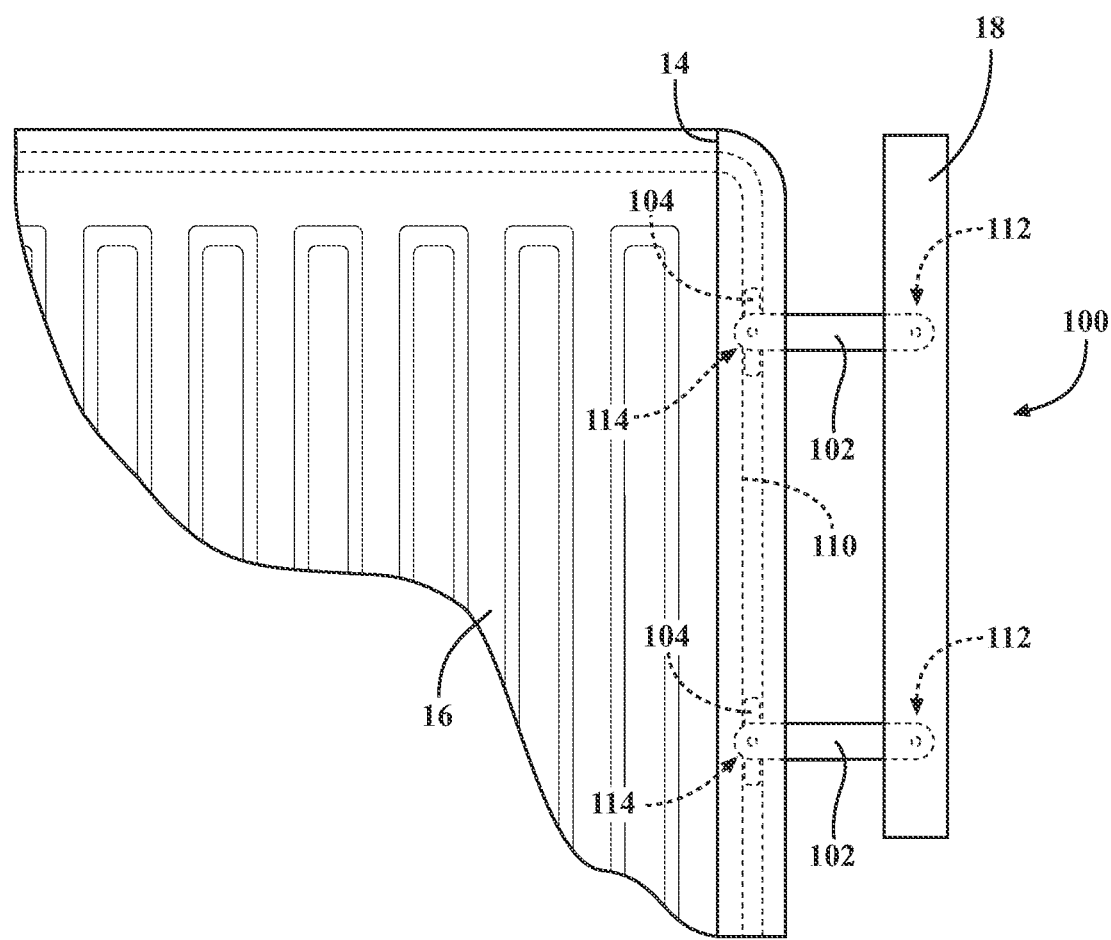
Figure 16:
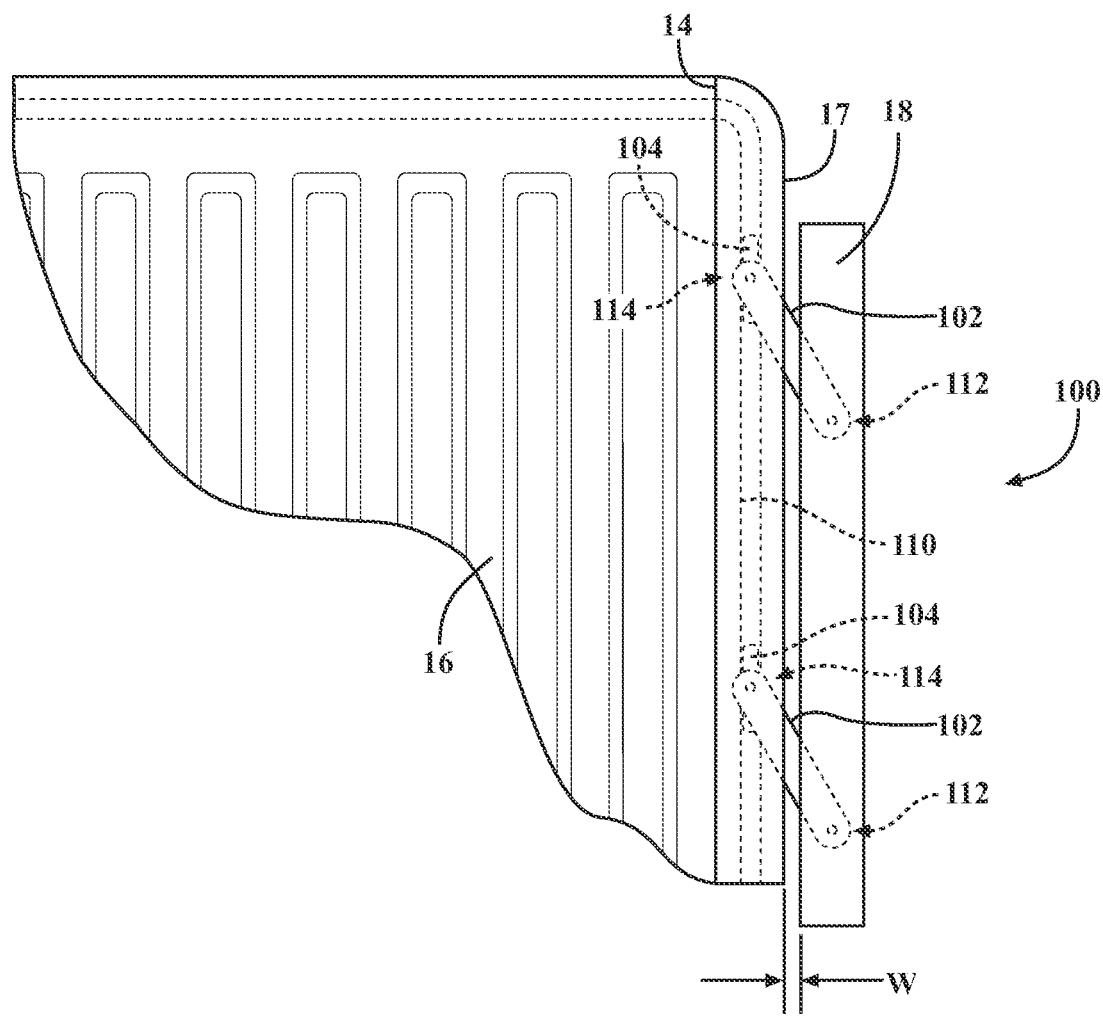
Figure 17:
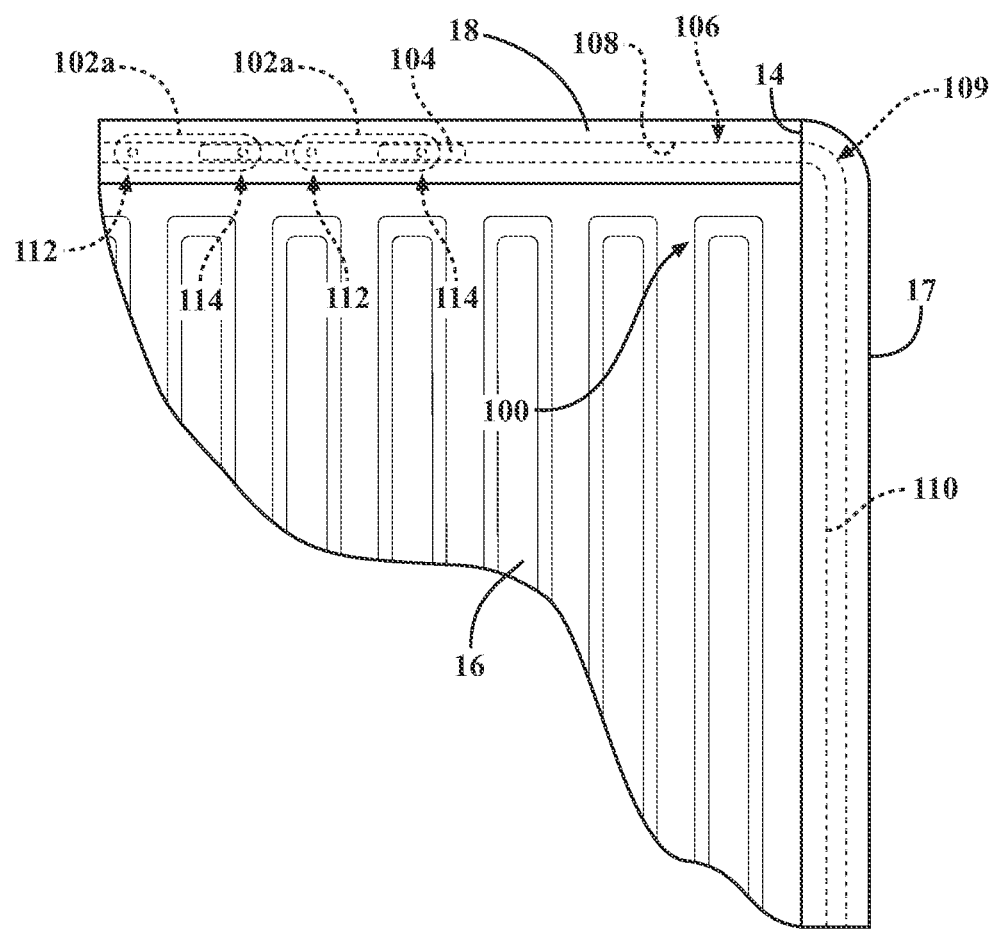
FIGS. 17-21 depict an articulating tailgate assembly incorporating at least one cargo door track mechanism, in accordance with aspects of the present invention.
Figure 18:
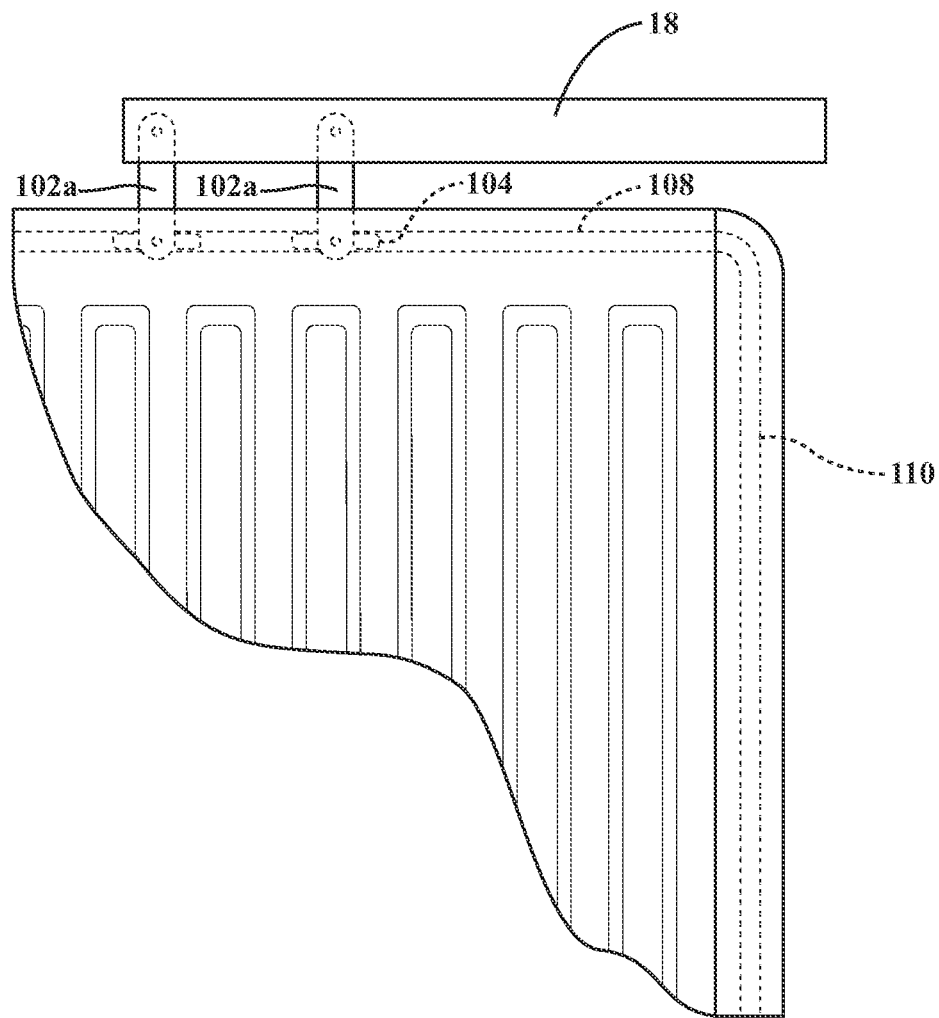
Figure 19:
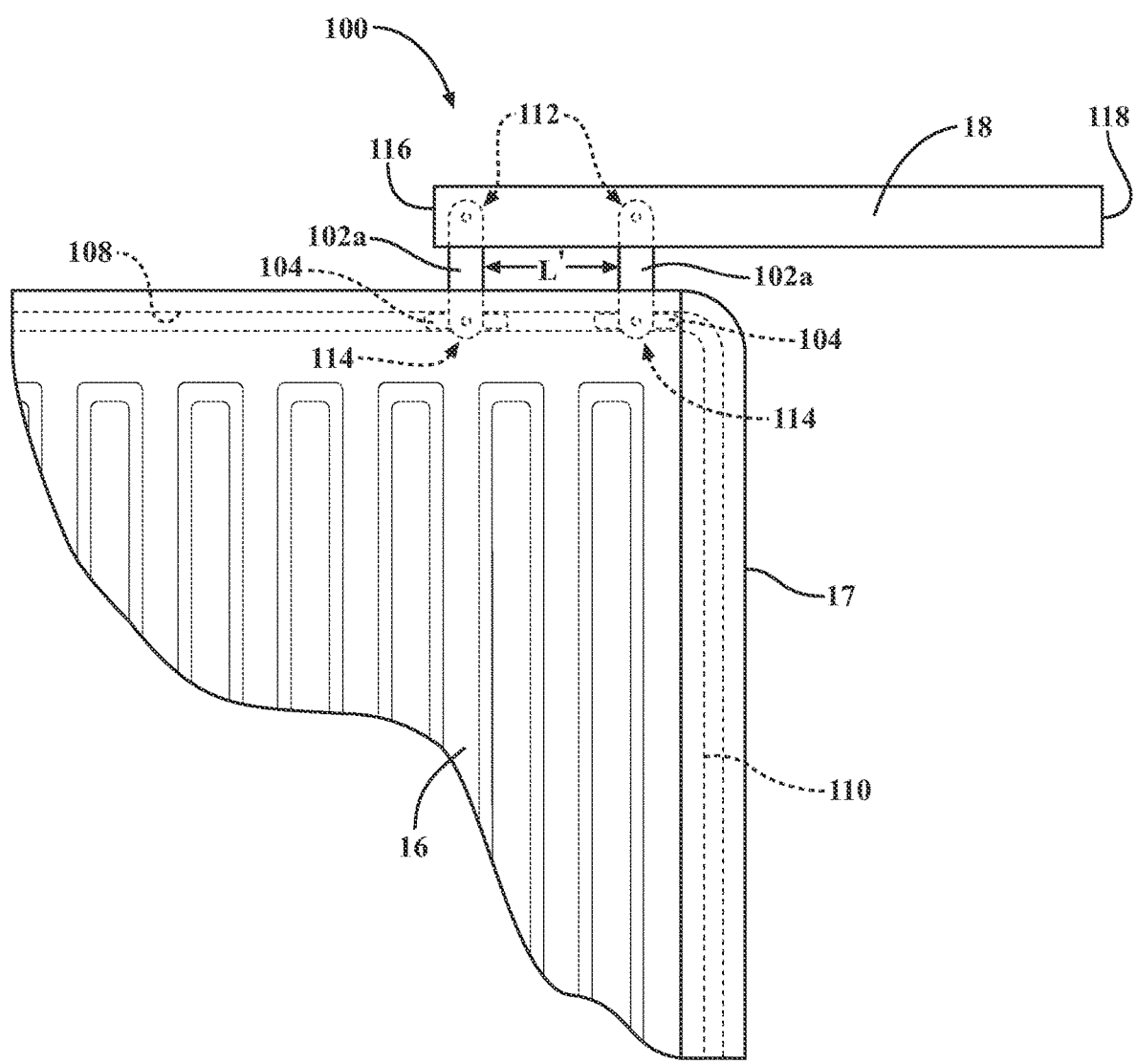
Figure 20:
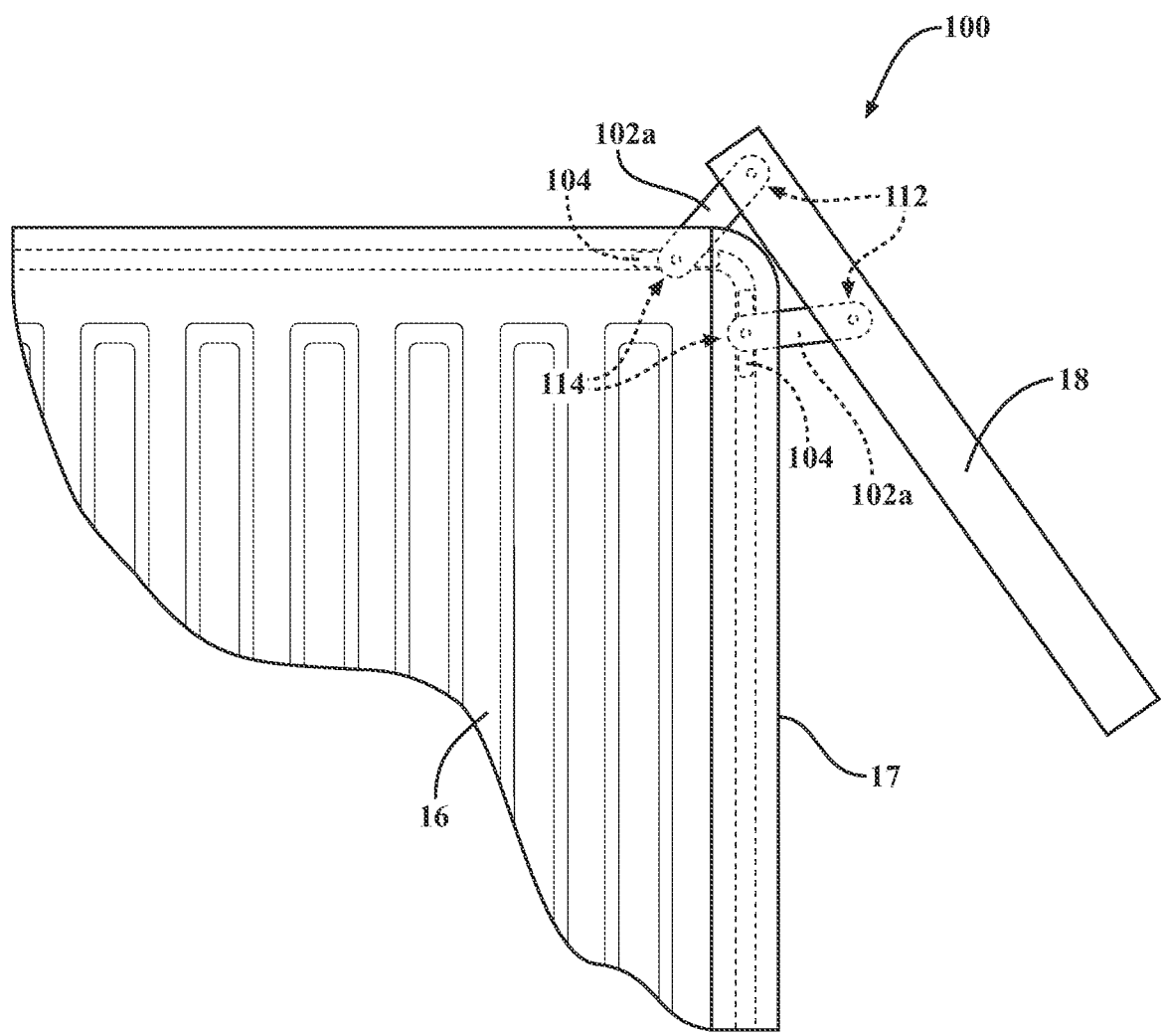

Each pair of guides 104,104 operably slide along the first track portion 108, manage the track corner 109, and slide along second track portion 110 as the pair of links 102 operably rotate during translation of the guides 104, thereby bringing the first panel 18 from a closed position at the rear of the vehicle to outside and substantially parallel to the sidewalls 17 of the cargo bed 16. In an exemplary fully open position, the door panel 18 is a predetermined distance from the vehicle sidewall 17 (e.g., indicated as CW in FIG. 16). FIG. 15 depicts the mechanism 100 of FIGS. 10-14, with a stand-off fully open position on the side of the vehicle (e.g., straight link(s) 102), in accordance with aspects of the present invention. FIG. 16 depicts the mechanism 100 of FIGS. 10-15, with the links 102 collapsed to bring the first panel 18 closer to the side of the vehicle in the fully open position, in accordance with aspects of the present invention.

Optionally, at least one bumper or stop is provided on at least one of the links 102 or otherwise built into the articulating structure to prevent over extension and unwanted contact with the side of the vehicle 11.

Figure 10:
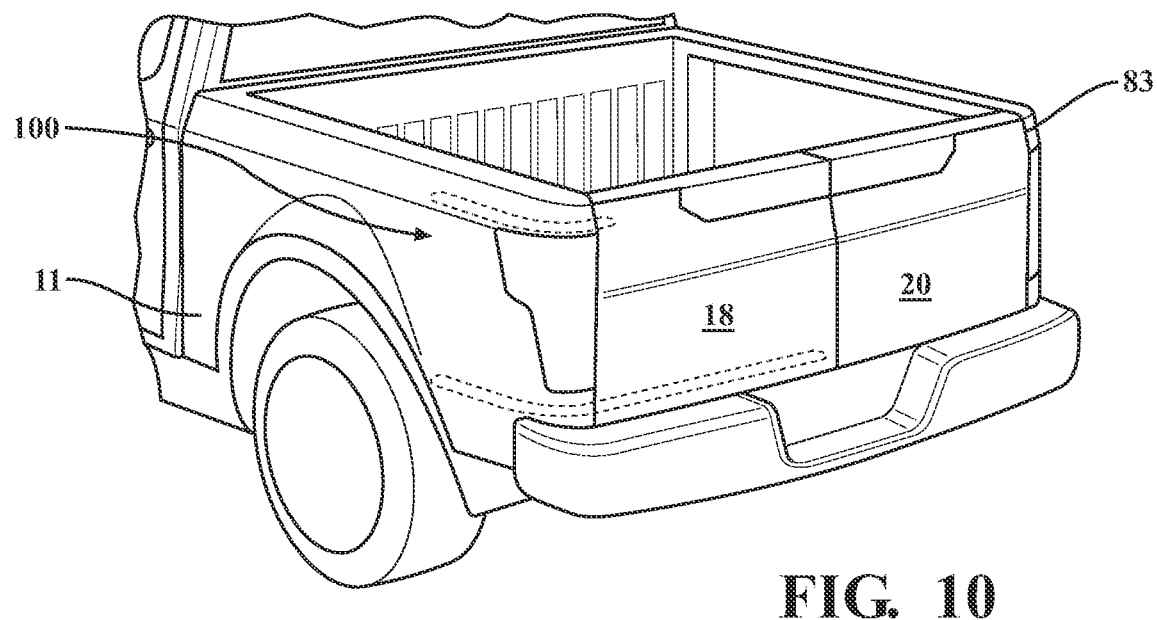
FIGS. 10-16 depict an articulating tailgate assembly incorporating at least one cargo door track mechanism, in accordance with aspects of the present invention.
Figure 11:
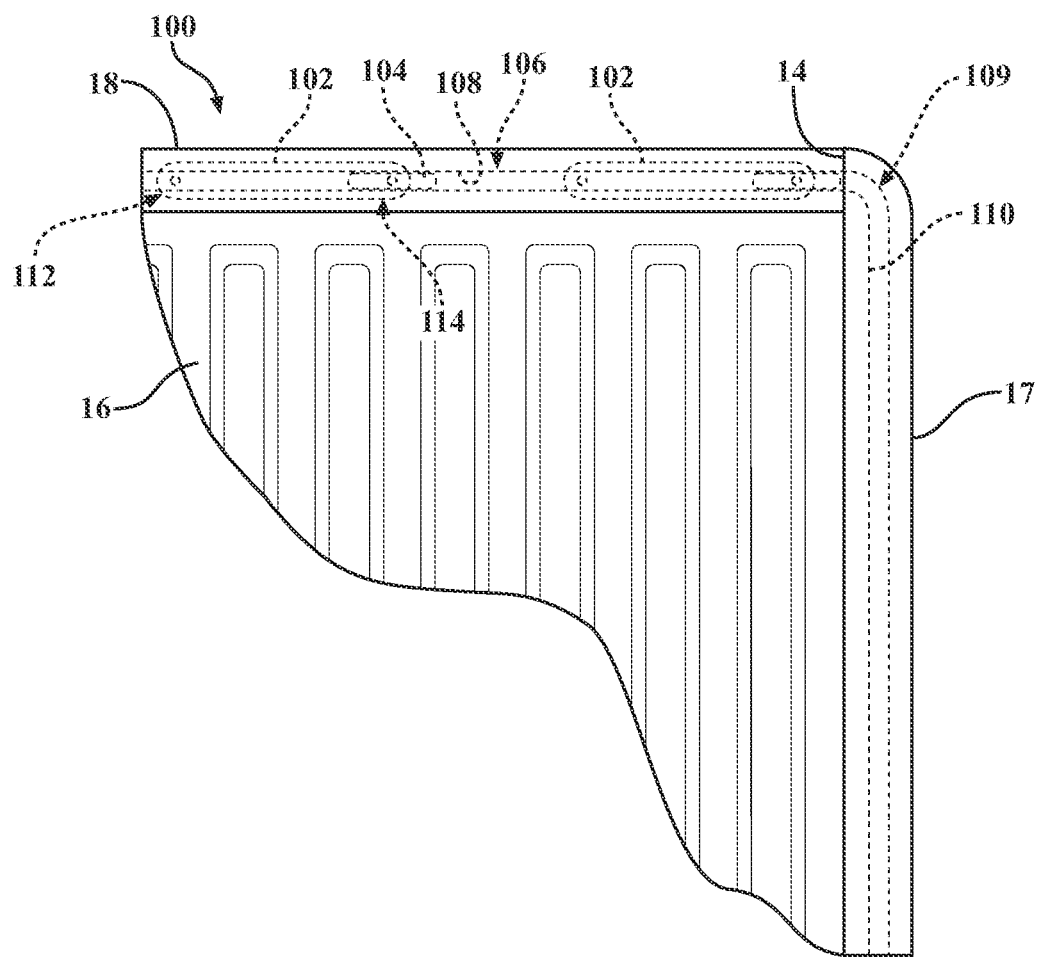
Figure 13:
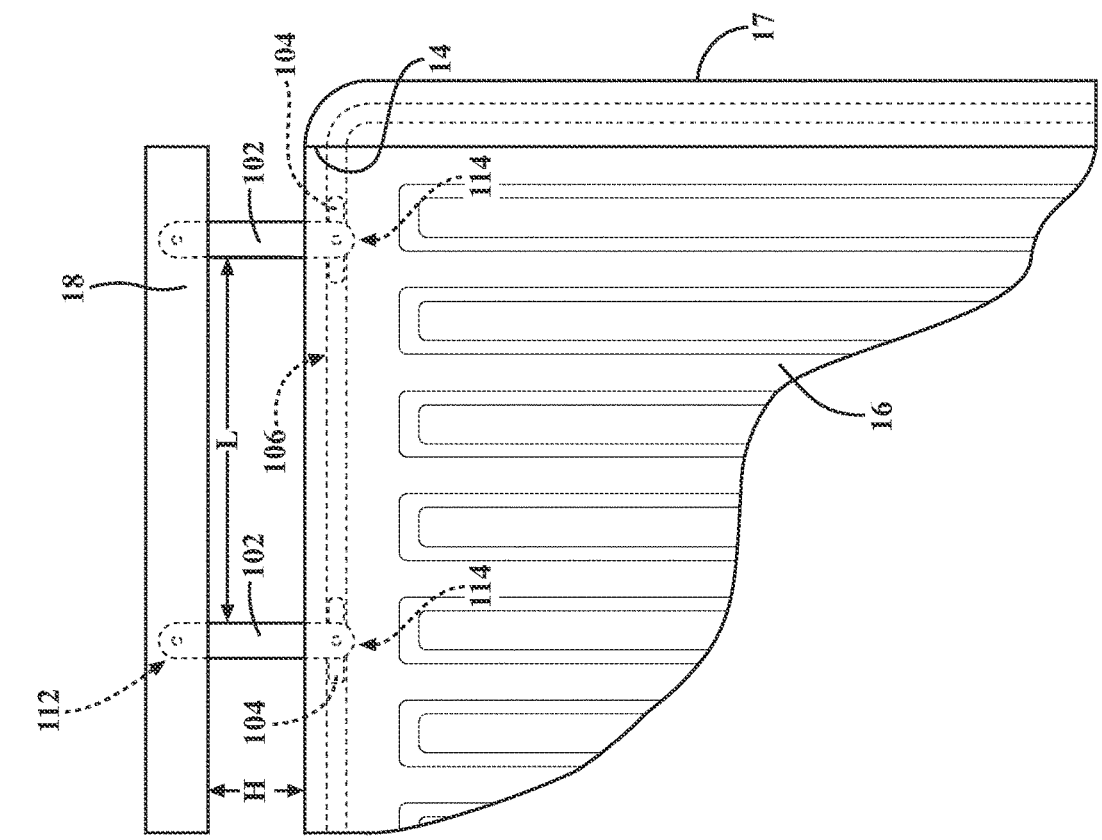
Figure 12:
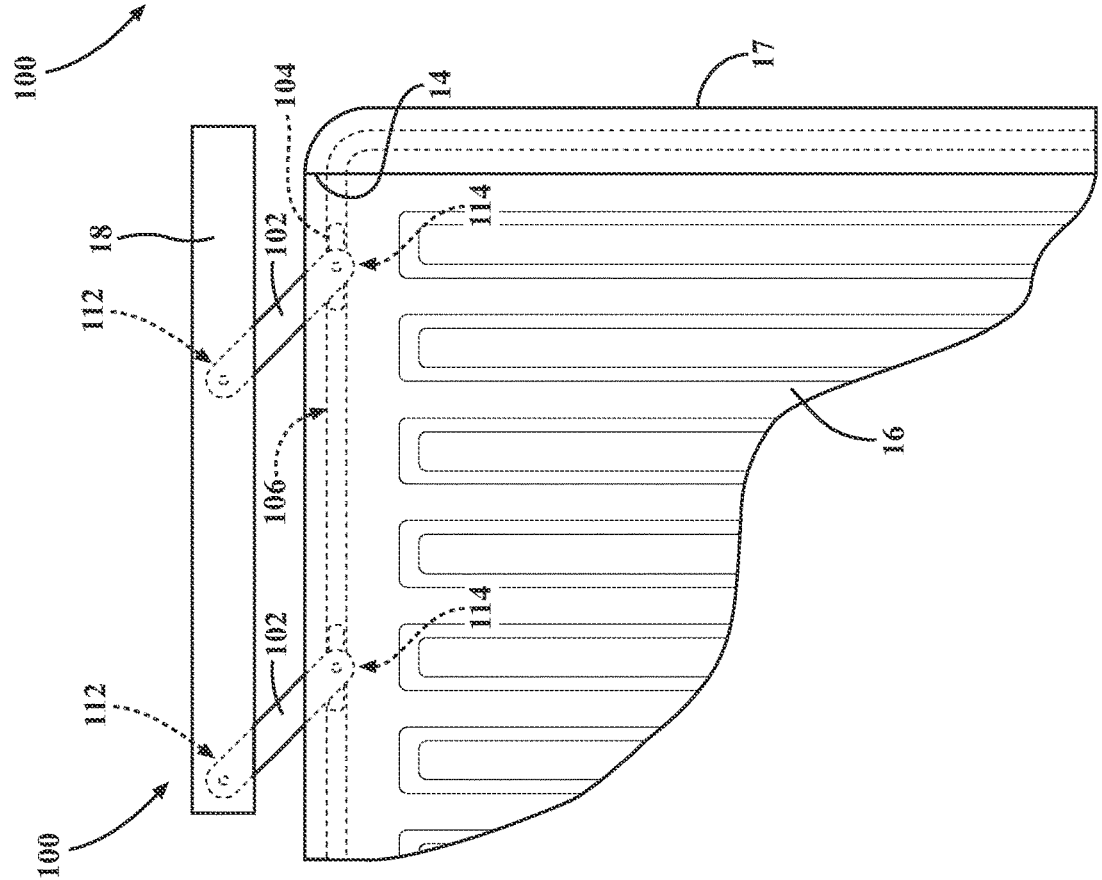
Figure 14:
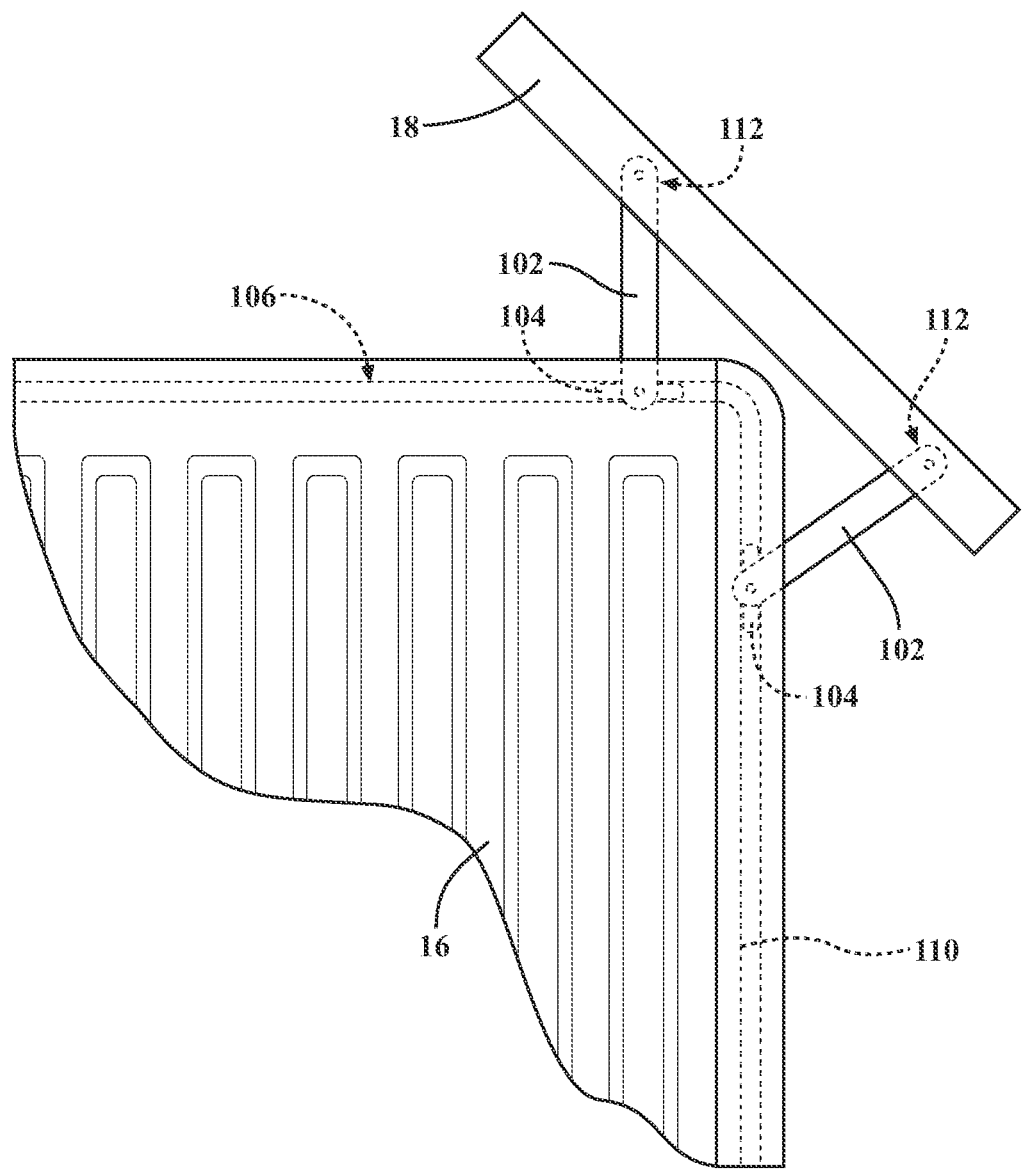

FIGS. 10-11 depict an exemplary closed position of the assembly 100. FIGS. 12-16 depict the first panel 18 moving between closed and open positions. It is understood that the right side of the assembly 100 is a mirror-image of the left side of the assembly 100.

The assembly with cargo door track mechanism 100 is adapted depending on the particular application without departure from the scope of the present invention. According to an aspect of the present invention, the mechanism links are sunk or embedded into the panel 18 or otherwise integrated to be out of the way when the tailgate is closed. Optionally, another track, e.g., an upper track, can be incorporated and the articulating assembly 100 operably adapted to additionally selectively traverse the track as the panels 18,20 move between the closed position and at least one open position.

Referring to FIGS. 1-55 generally, and more particularly to FIGS. 17-21, there is depicted the articulating tailgate assembly indicated generally at 100 substantially identical to FIGS. 10-16, wherein like numbers indicate like parts and the previous descriptions are incorporated here in entirety. Further depicted in FIGS. 17-21 is an exemplary alternative placement of at least one link 102a, preferably at least one pair of links 102a,102a. The pair of links 102a is placed a predetermined distance closer toward the following end 116 of the first panel 18 than the leading end 118. Thus, the pair of links 102a is more centrally located in the assembly 100 when in the closed position. The predetermined length of the links 102a is shorter and the predetermined distance between the links 102a and 102a (indicated at L' in FIG. 19) is less.

Figure 21:
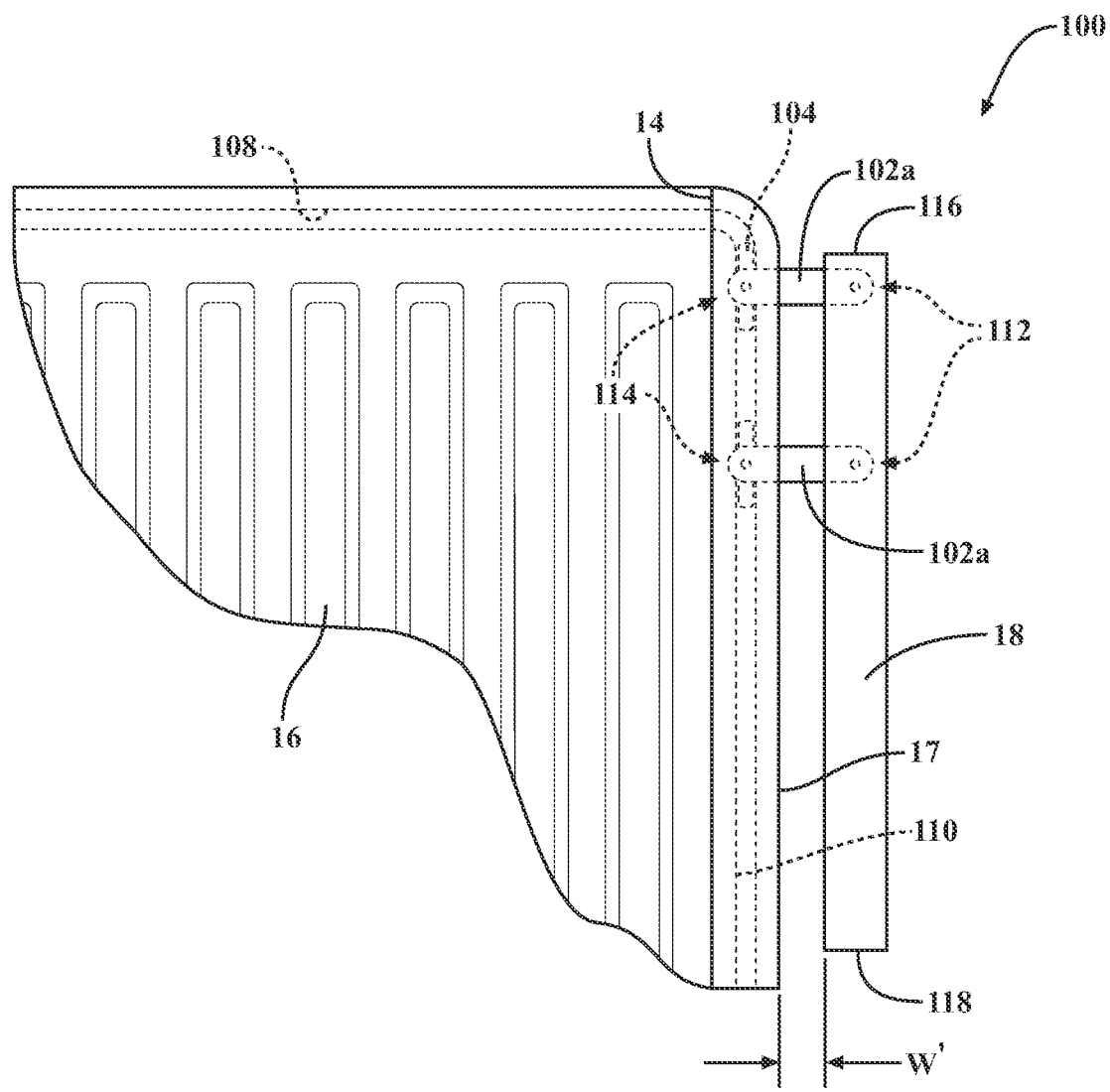
Figure 22:
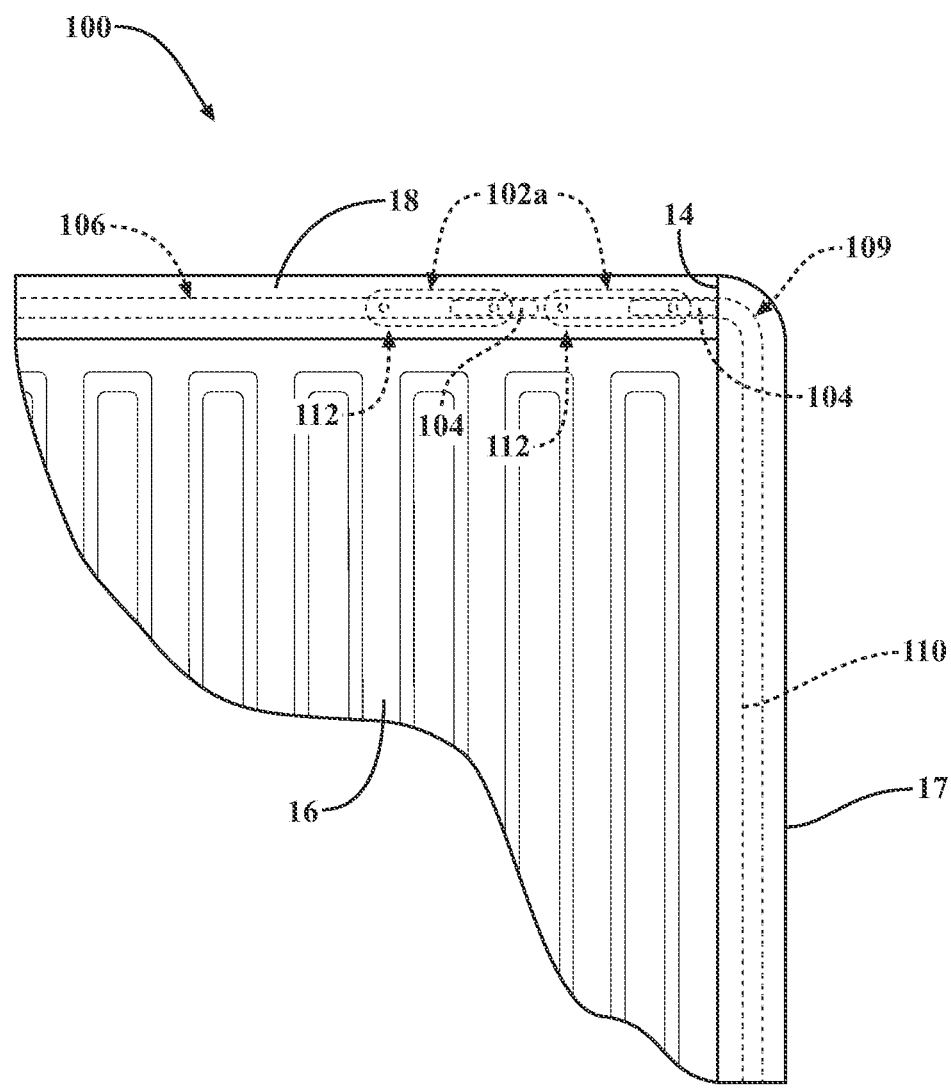
FIGS. 22-25 depict an articulating tailgate assembly incorporating at least one cargo door track mechanism, in accordance with aspects of the present invention.
Figure 23:
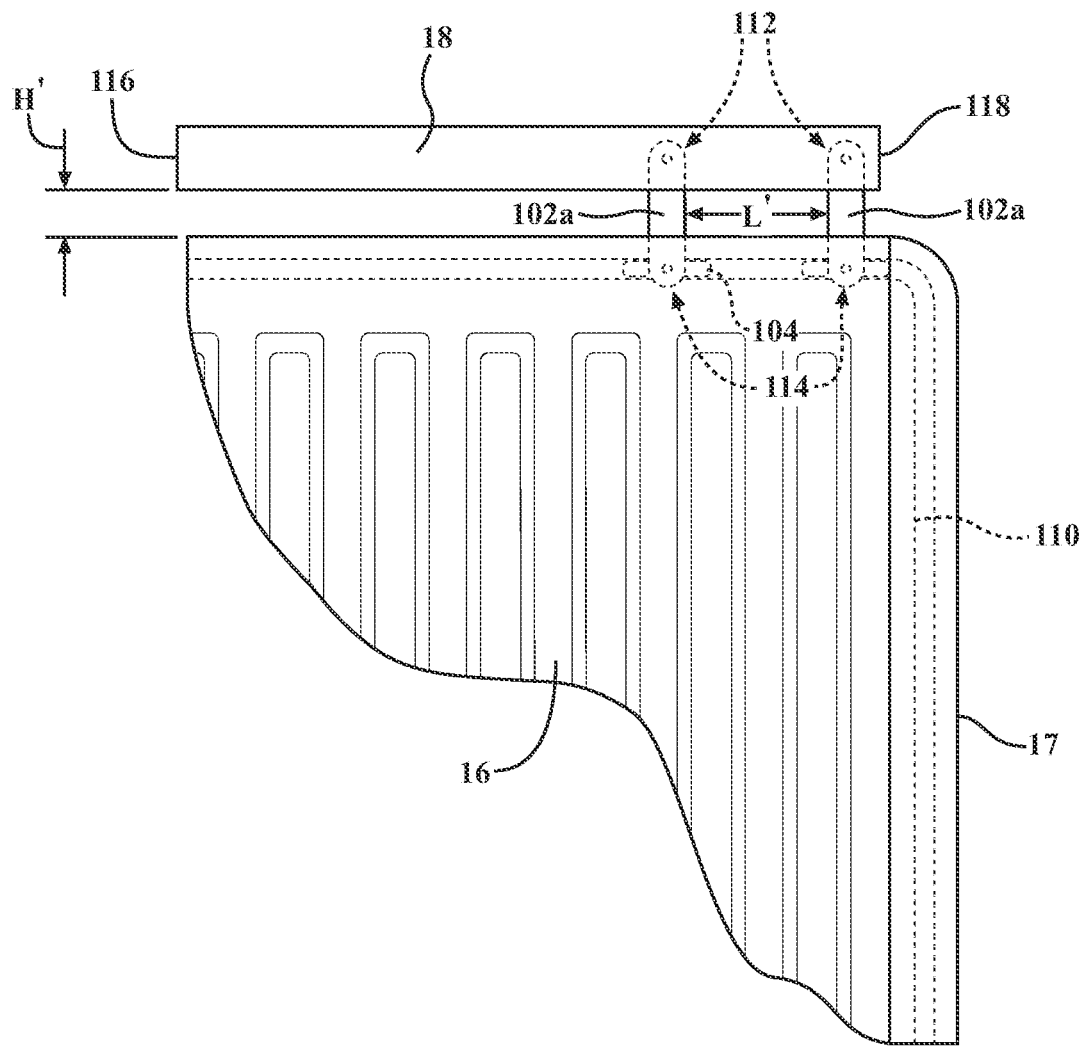
Figure 24:
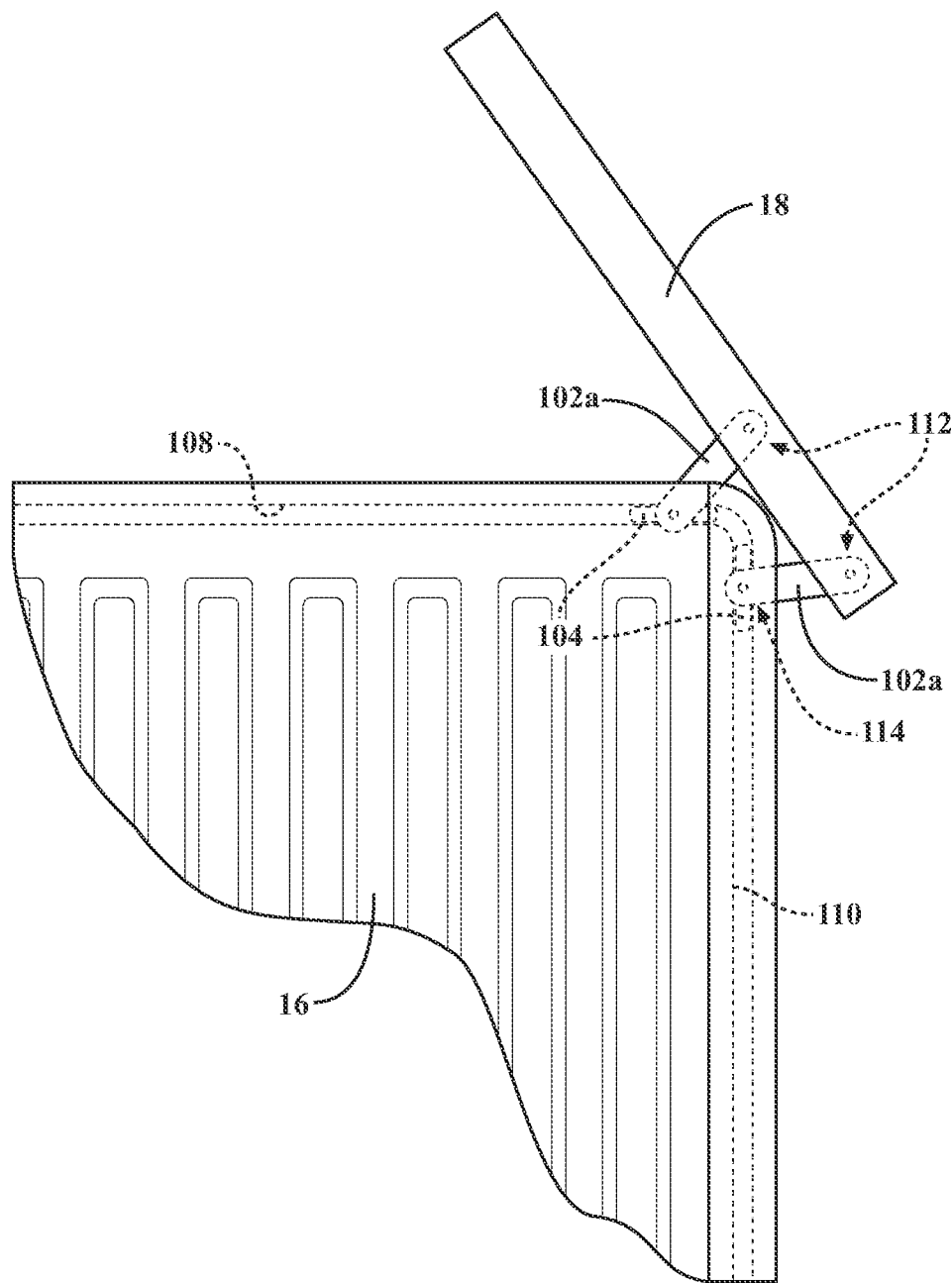

In an exemplary fully open position, the door panel 18 is a predetermined distance from the vehicle sidewall 17 (e.g., indicated as CW in FIG. 21). FIG. 21 depicts the mechanism 100 with a stand-off fully open position on the side of the vehicle, in accordance with aspects of the present invention. However, it is understood that, alternatively, pair of links 102a can be adapted to operably collapse to bring the first panel 18 closer to the side of the vehicle in the fully open position, in accordance with aspects of the present invention.

It is understood that the predetermined lengths of the links 102a, pivotal attachment location to the first panel 18, and distances relative to each other 102a and 102a and the guides 104,104 are each adaptably suitable to the particular applications without departure from the scope of the present invention.

Referring now more particularly to FIGS. 22-25, there is depicted the articulating tailgate assembly indicated generally at 100 substantially identical to FIGS. 10-16 and 17-21, wherein like numbers indicate like parts and the previous descriptions are incorporated here in entirety. Further depicted in FIGS. 22-25 is an exemplary alternative placement of at least one link 102a, preferably at least one pair of links 102a,102a. The pair of links 102a is placed a predetermined distance closer toward the leading end 118 of the first panel 18 than the following end 116. Thus, the pair of links 102a is less centrally located in the assembly 100 when in the closed position.

Figure 25:
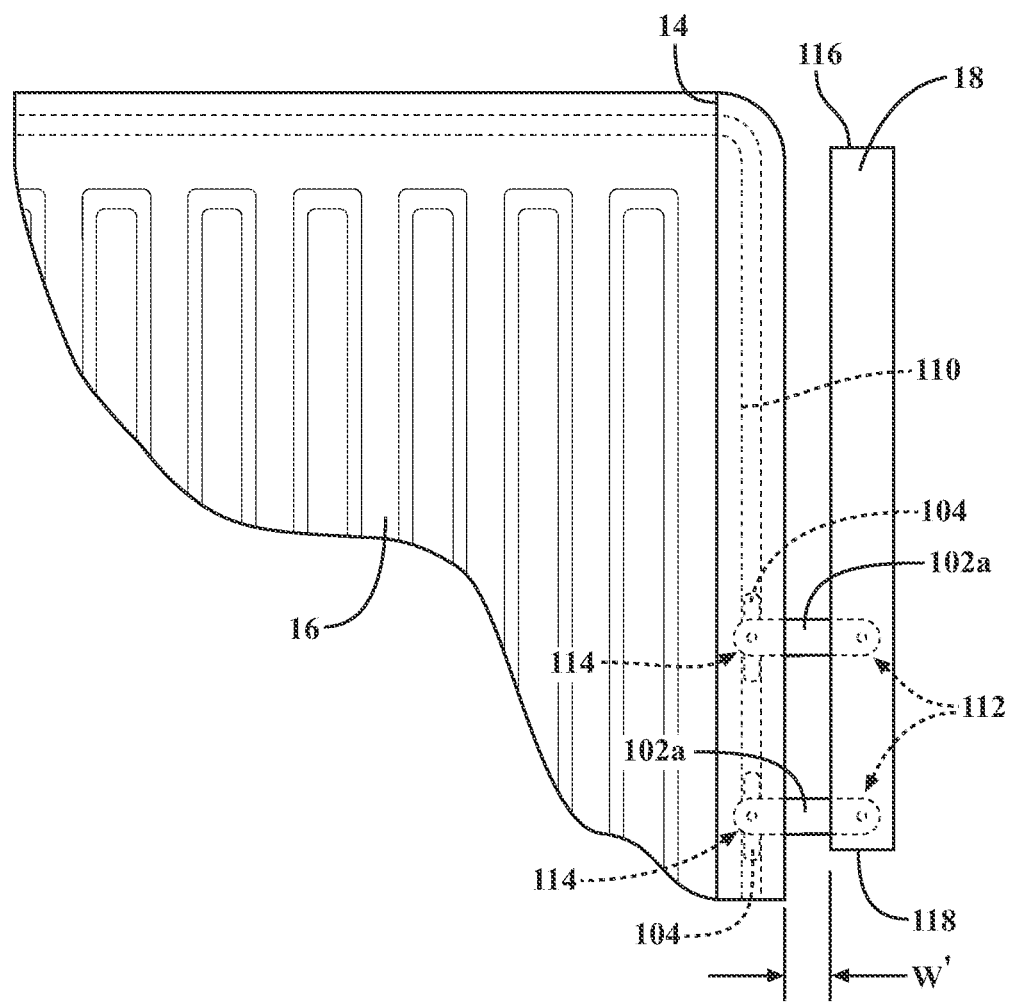
Figure 26:
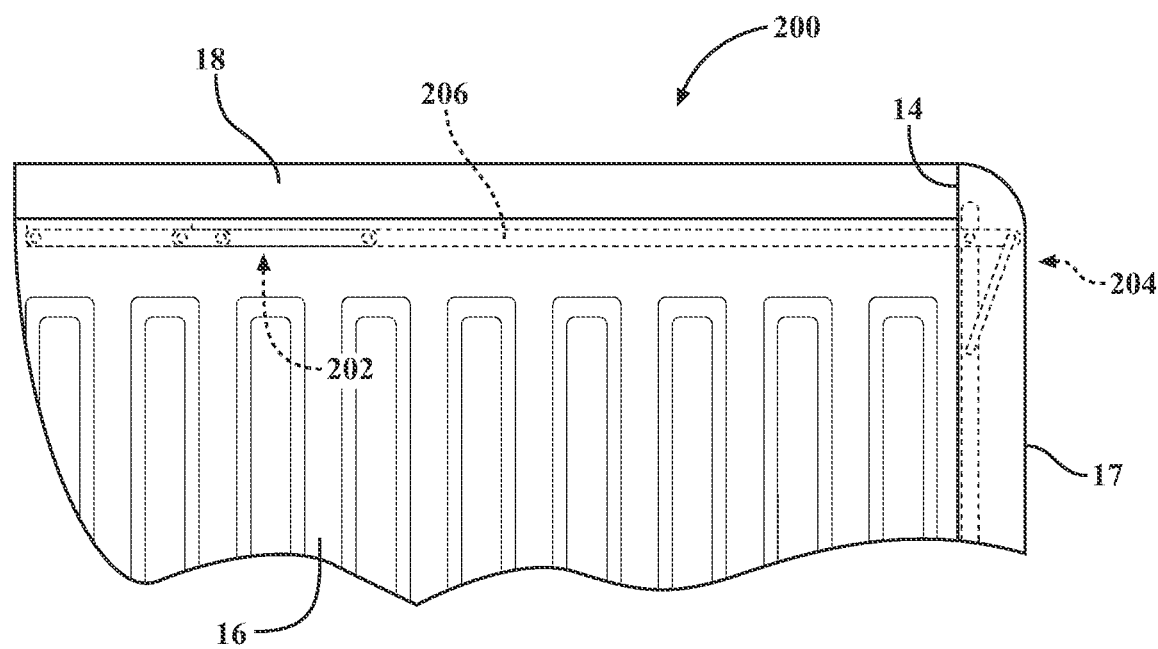
FIGS. 26-31 depict an articulating tailgate assembly incorporating at least one four-bar slider mechanism, in accordance with aspects of the present invention.

In an exemplary fully open position, the door panel 18 is a predetermined distance from the vehicle sidewall 17 (e.g., indicated at W' in FIG. 25). FIG. 25 depicts the mechanism 100 with a stand-off fully open position on the side of the vehicle, in accordance with aspects of the present invention. However, it is understood that, alternatively, pair of links 102a can be adapted to operably collapse to bring the first panel 18 closer to the side of the vehicle in the fully open position, in accordance with aspects of the present invention.

It is understood that the predetermined lengths of the links 102a, pivotal attachment location to the first panel 18, and distances relative to each other 102a and 102a and the guides 104,104 are each adaptably suitable to the particular applications without departure from the scope of the present invention.

Referring to FIGS. 1-55 generally, it is understood that any described length, height, width, and distance is merely exemplary in nature and is non-limiting.

Referring now more particularly to FIGS. 26-31, there is depicted the articulating tailgate assembly indicated generally at 200 incorporating a multi-bar slider mechanism, in accordance with aspects of the present invention. Most preferably, a 4-bar slider mechanism for moving the panel 18 from a closed to the open positions using at least one first linkage assembly 202 to move the panel 18 generally outward and operably cooperating with another at least one second linkage assembly 204 operably rotating the panel 18 to at least one open position outside the sidewall 17 of the vehicle cargo bed to open up the opening 14 into the cargo bed for improved access. The first linkage assembly 202 is connected to the second linkage assembly 204 with at least one rod 206.

The first linkage assembly 202 includes a first pair of first pivot joints 212,212 operably coupled to the first panel 18 and a second pair of pivot joints 214,214 operably coupled to the rod 206 toward one end of the rod 206.

The second linkage assembly 204 includes a third pivot joint 216 rotatably connecting the rod 206 and operably adapted to translate along a track 220. A second rod 218 is operably adapted to slide along the track 220 at one end 224 and is rotatably connected at another pivot joint 222 to the other end of the rod 206.

Figure 27:
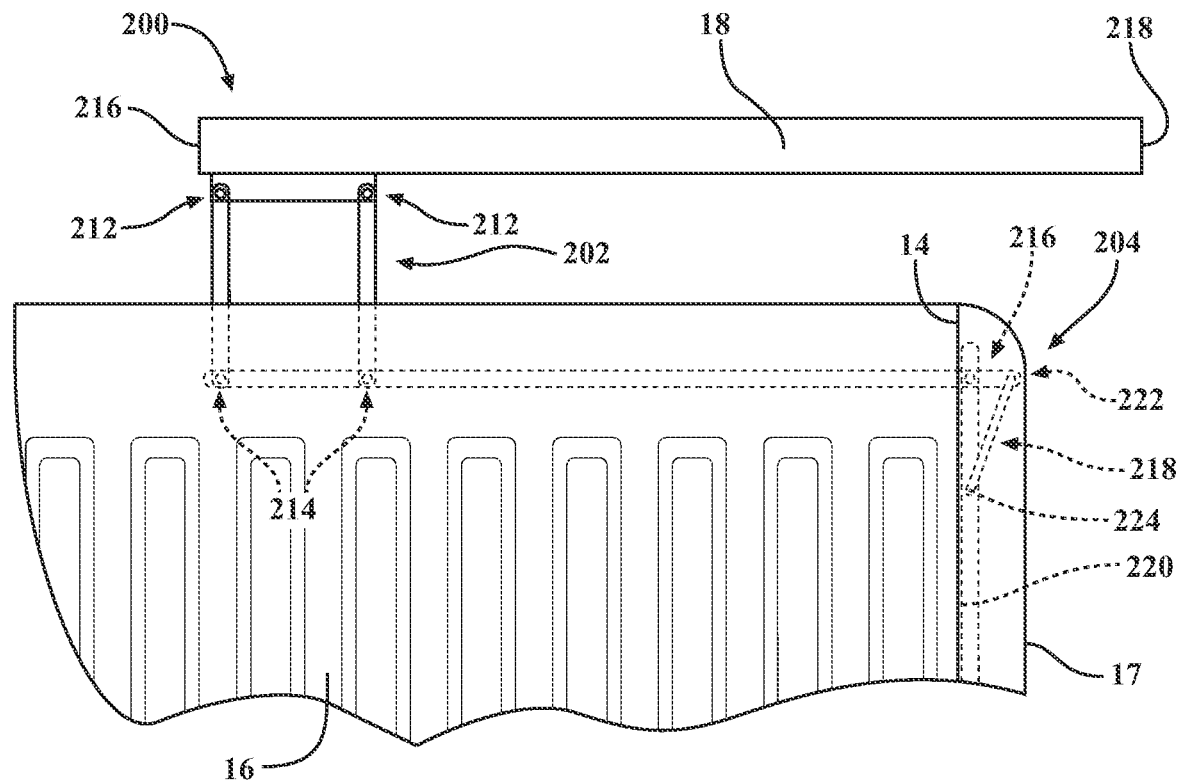
Figure 28:
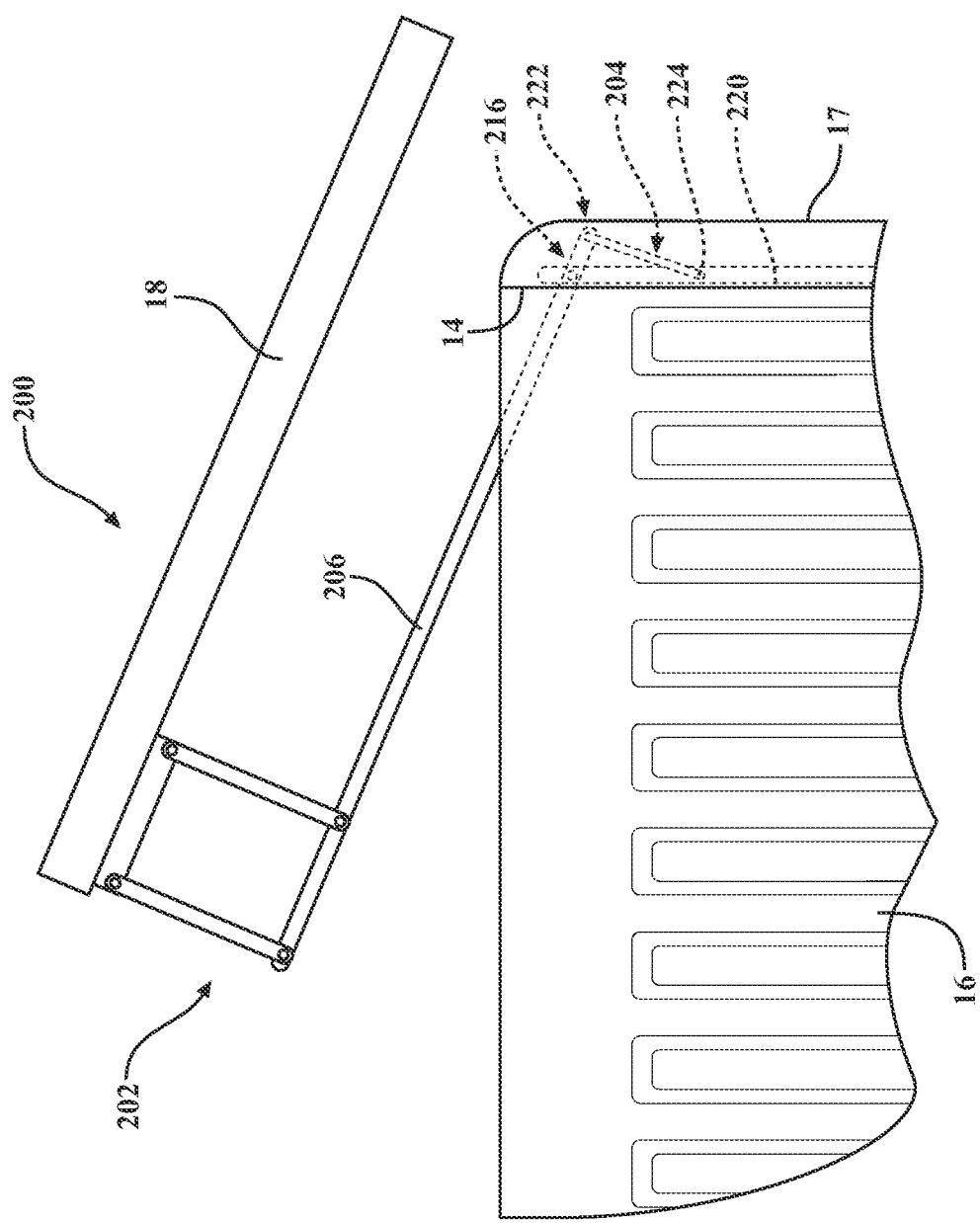
Figure 29:
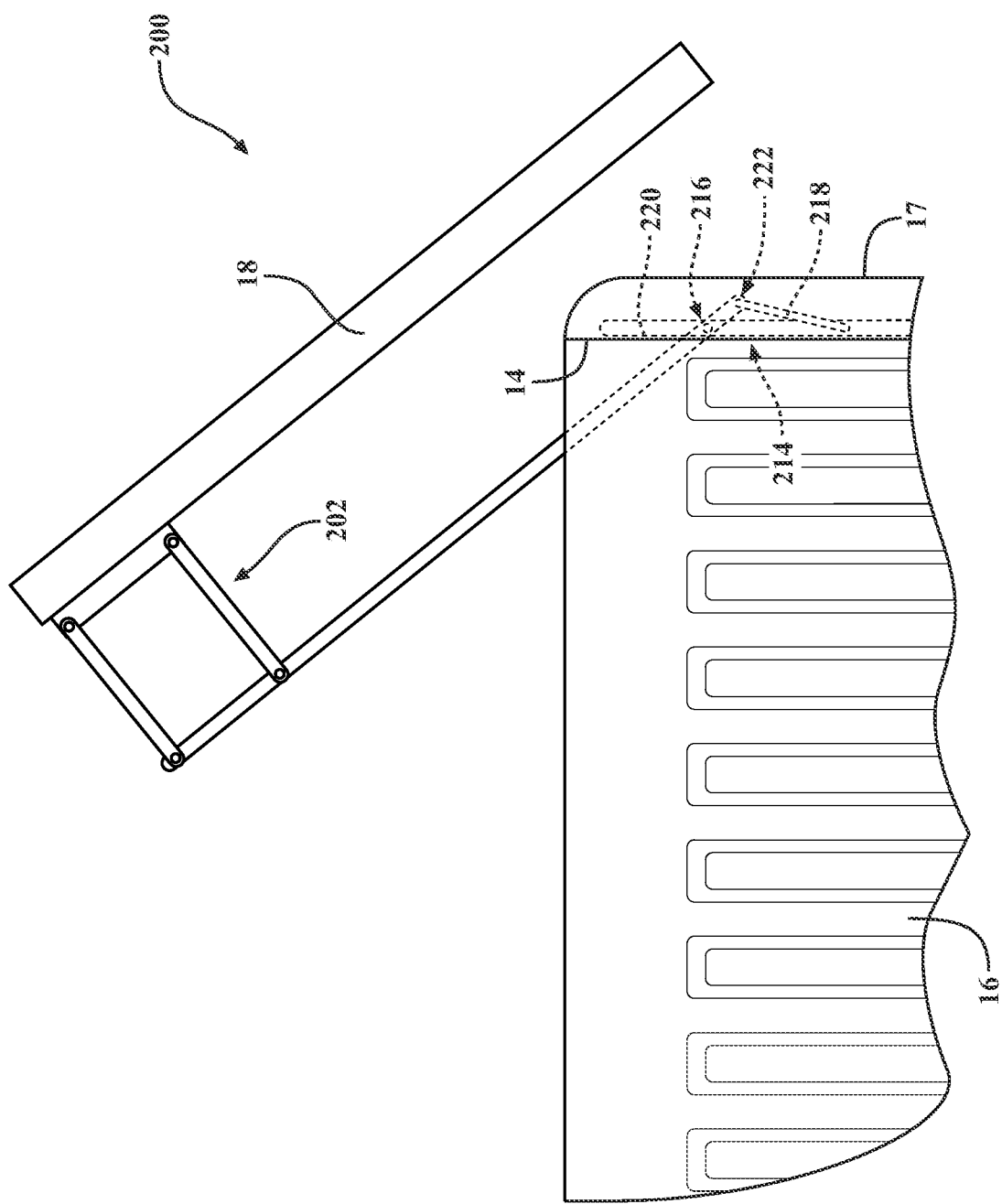
Figure 30:
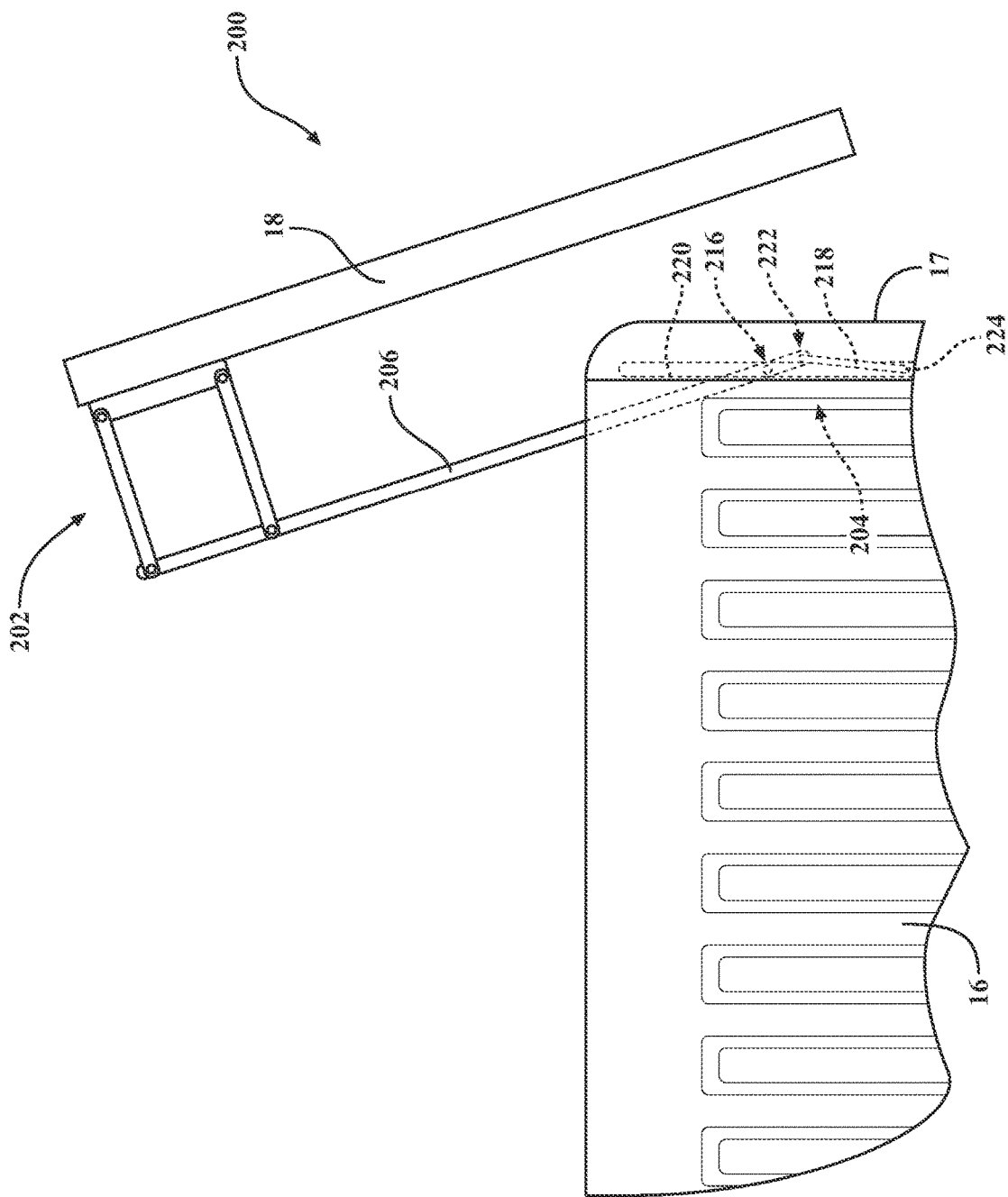
Figure 31:
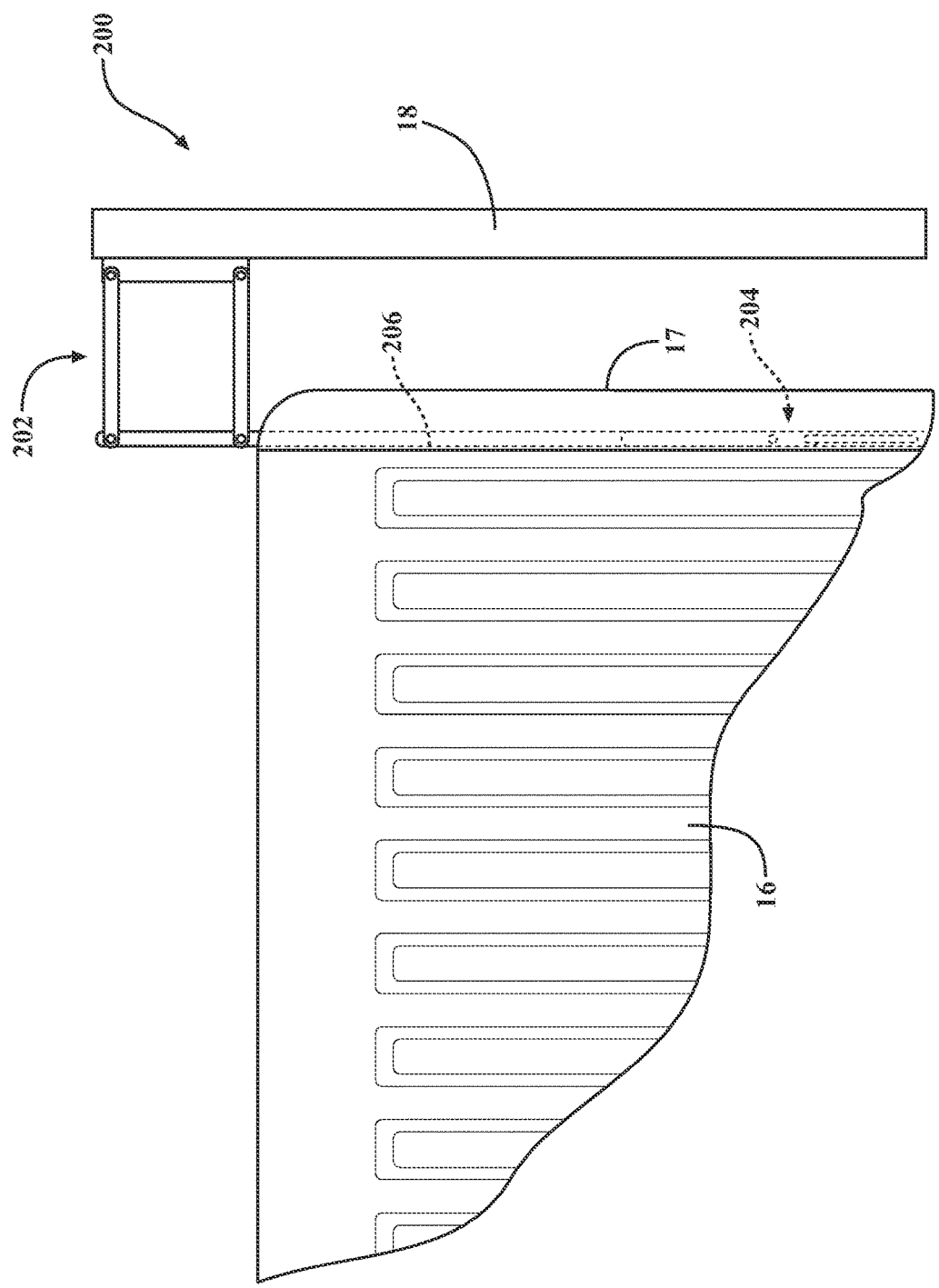
Figure 32:
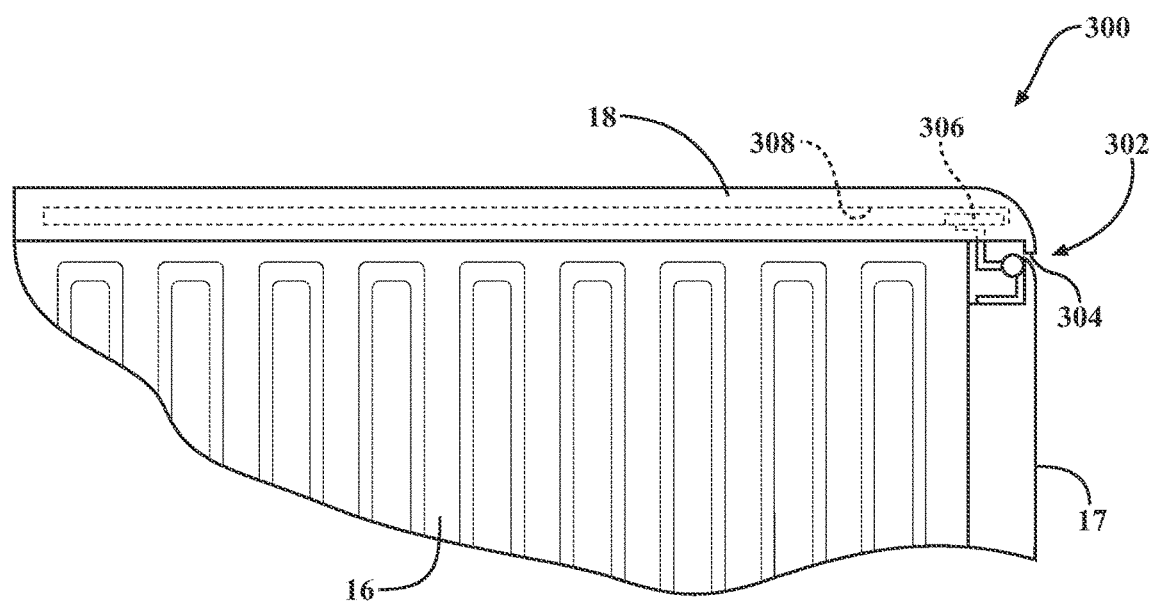
FIGS. 32-35 and 44 depict an articulating tailgate assembly incorporating at least one door hinge and slider, in accordance with aspects of the present invention.
Figure 33:
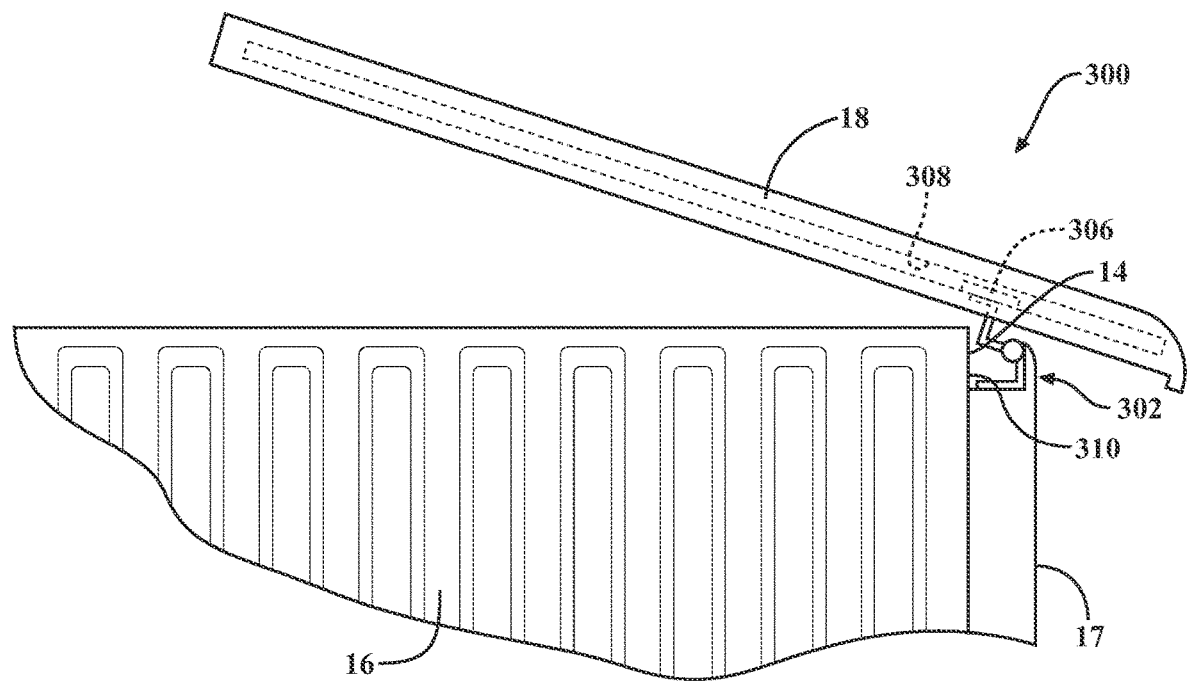
Figure 34:
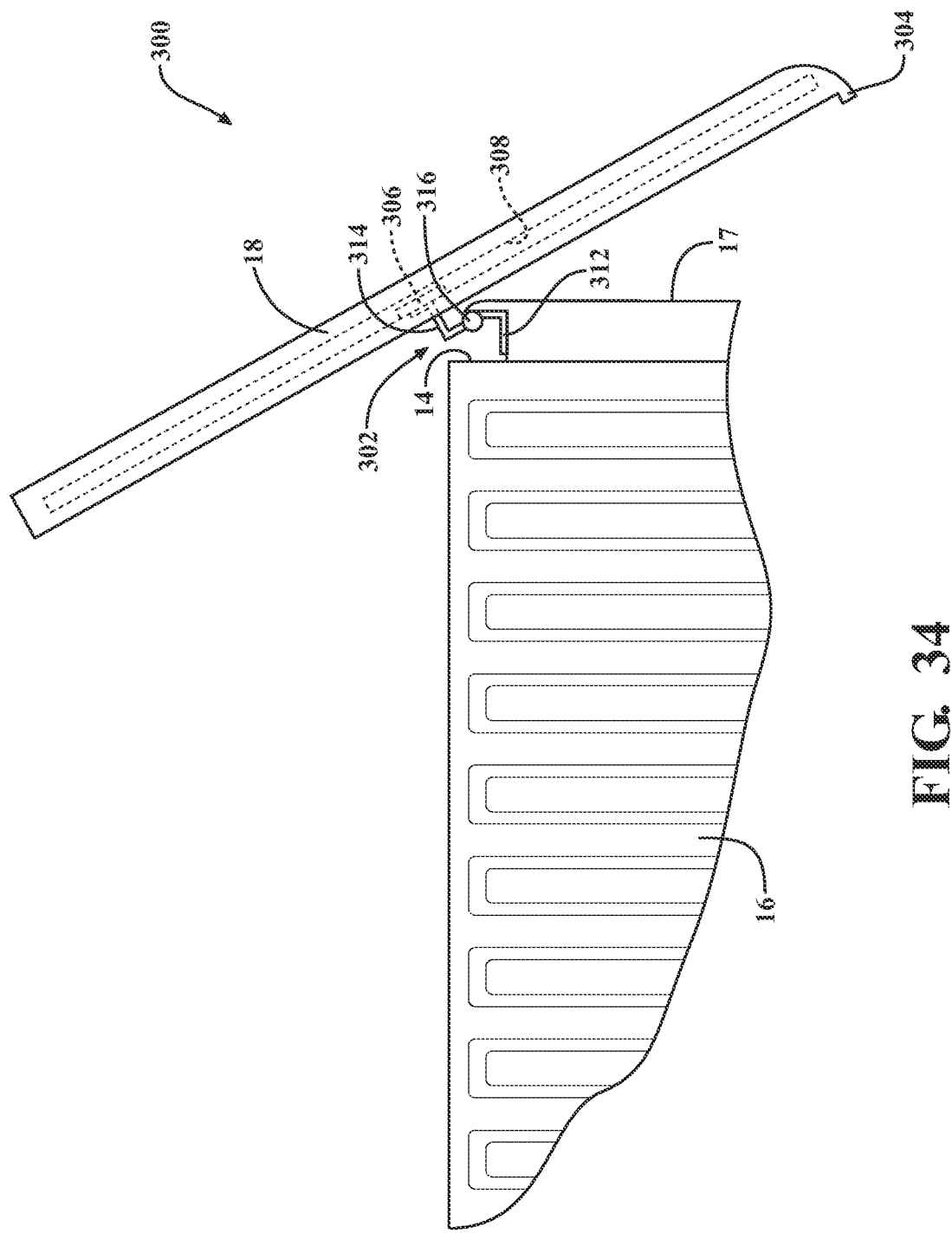
Figure 35:
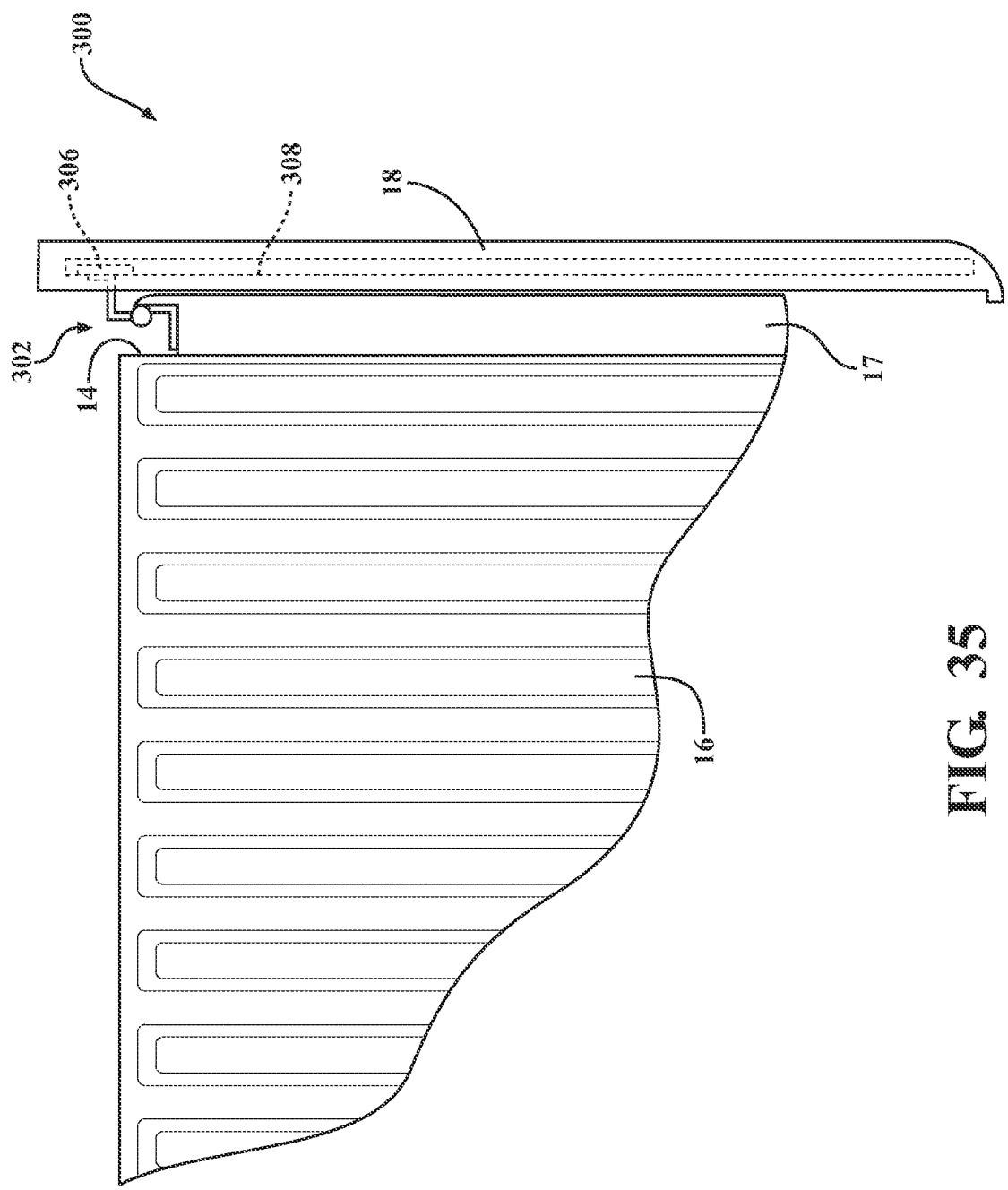

FIG. 27 depicts the first panel 18 lifted rearward by the first linkage assembly 202. As the first panel 18 is further rotated toward the side 17 of the vehicle, the second linkage assembly 204 rotates and the second rod 218 draws the joint 216 and rod end 224 along the track until the first panel 18 is at the outside of the sidewall 17 and substantially parallel. FIG. 31 is an exemplary fully open position with the first linkage assembly 204 in a stand-off position from the sidewall 17.

Referring now more particularly to FIGS. 32-39 and 44, there is depicted the articulating tailgate assembly indicated generally at 300 incorporating a door hinge and slider or lead screw mechanism, in accordance with aspects of the present invention. At least one articulating mechanism, shown generally at 302, is depicted moving the first panel 18 between the closed position and open positions. Each articulating mechanism 302 (e.g., door hinge with slider mechanism) includes at least one hinge 304 portion and is operably coupled to a slider 306 that each move along (e.g., slides on or within) at least one track. Preferably, a recess 310 is provided that the articulating mechanism 302 is adapted to operably connect to. Preferably, a first flange 312 of the articulating mechanism 302 is adapted to connect to the vehicle and a second flange 314 is adapted to operably connect to the slider 306. The FIGS. 32-39 depict an extended width panel with a longer end or sidewall overlapping 304, however, it is understood that the assembly 300 is adaptable for a standard width.

As the first panel 18 moves from the closed position (FIG. 32) to the fully open position (FIG. 35), the first panel 18 is rotated outward by the at least one articulating mechanism 302 (e.g., hinge) while the first panel 18 is slid to outside the sidewall 17 via the at least one track 308 (e.g., that is embedded into the interior surface of the first panel 18 or attached thereto) with the slider 306 of the articulating mechanism 302 sliding (on or in) the track 308.

Figure 36:
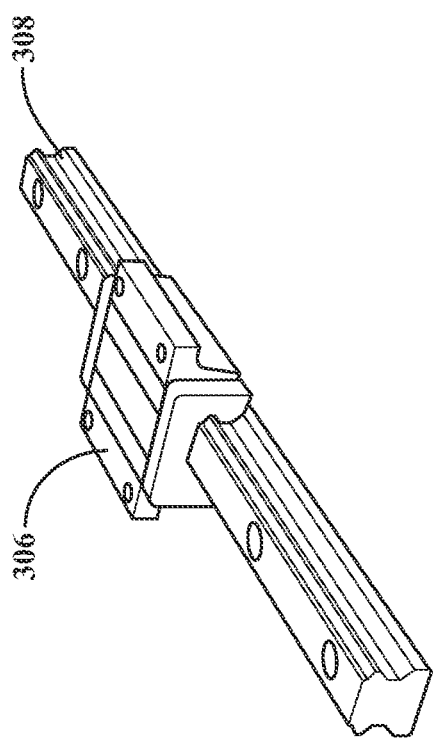
FIG. 36 depicts an exemplary linear slider track incorporable into the articulating tailgate assembly, in accordance with aspects of the present invention.

FIG. 36 depicts an exemplary linear slider—track option for articulation for use in FIGS. 32-35 and 44, according to an aspect of the present invention.

Figure 37:
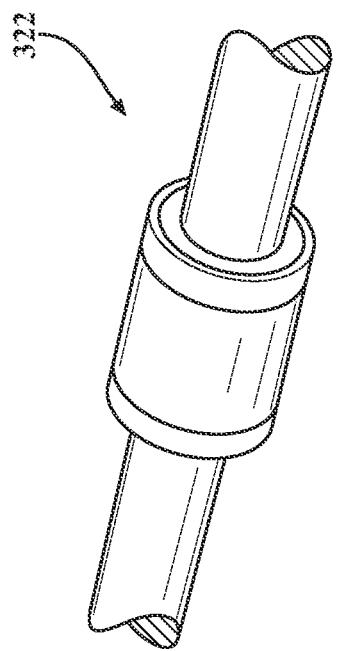
FIG. 37 depicts an exemplary lead screw mechanism incorporable into the articulating tailgate assembly, in accordance with aspects of the present invention.
Figure 39:
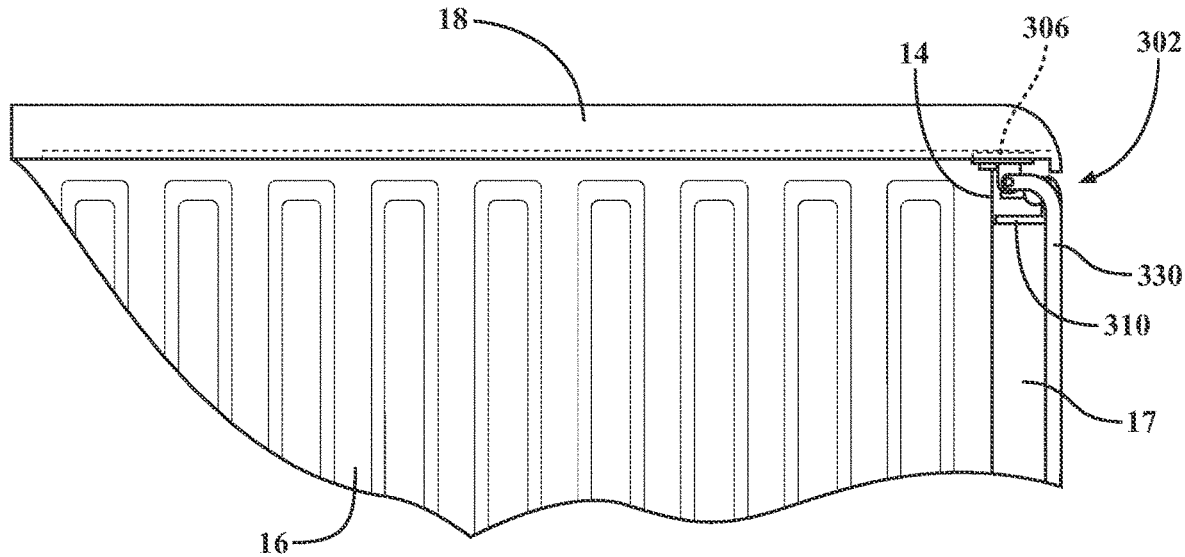
FIGS. 39-43 depict an articulating tailgate assembly incorporating the cargo door slider and hinge with linear slider overlaid, in accordance with aspects of the present invention.
Figure 40:
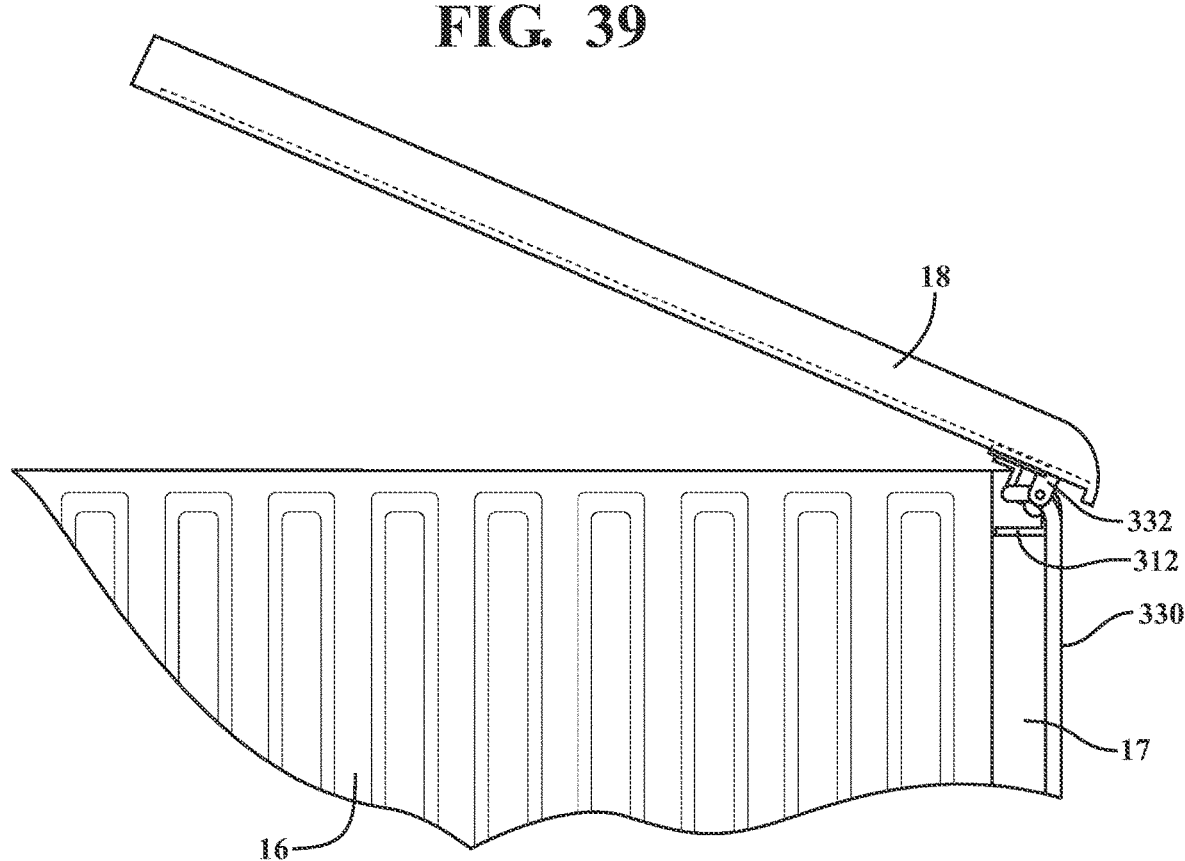
Figure 41:
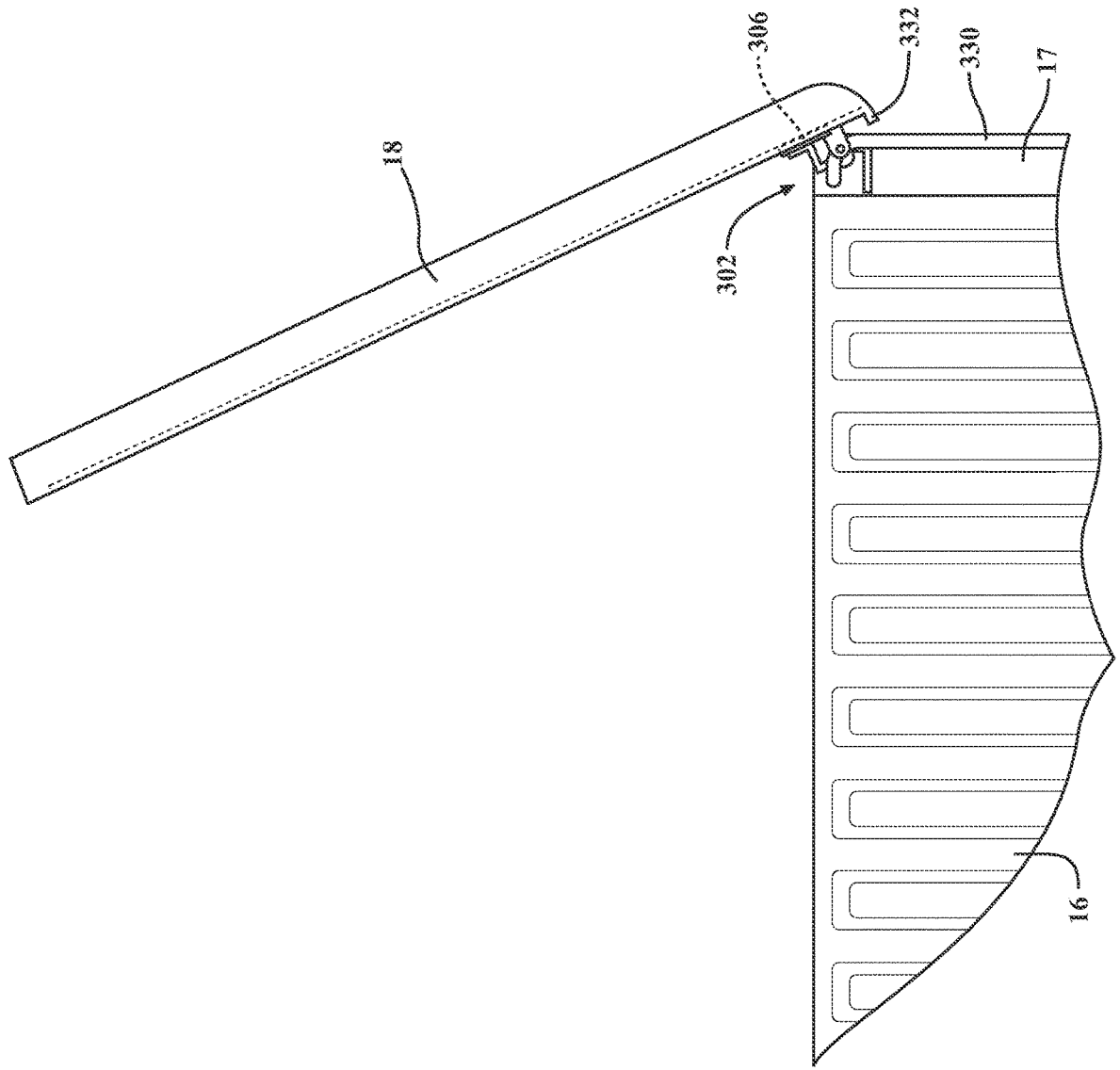
Figure 42:
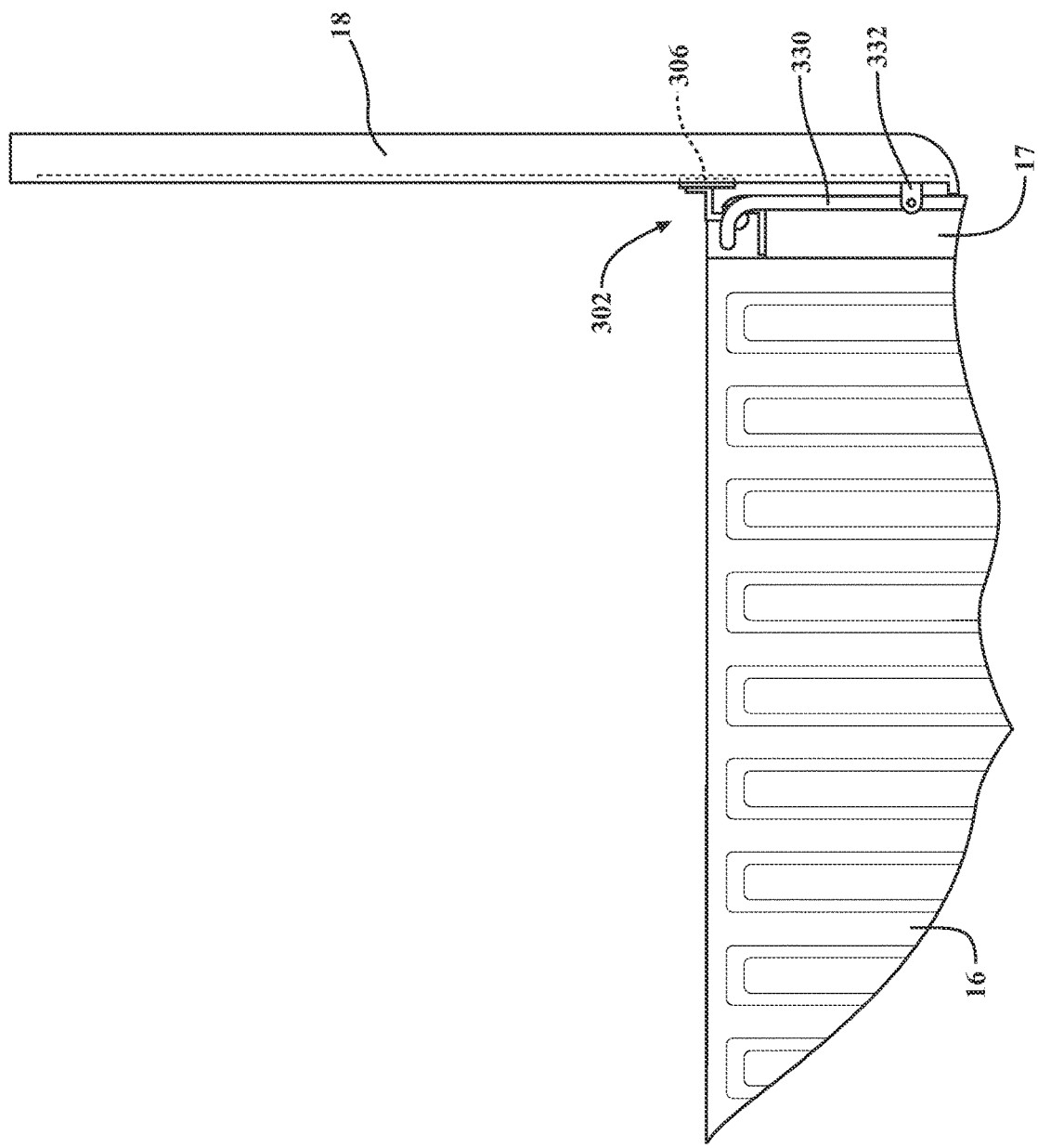

FIG. 37 depicts a linear slider—round option for articulation for use in FIGS. 32-35 and 44, in accordance with aspects of the present invention.

Figure 38:
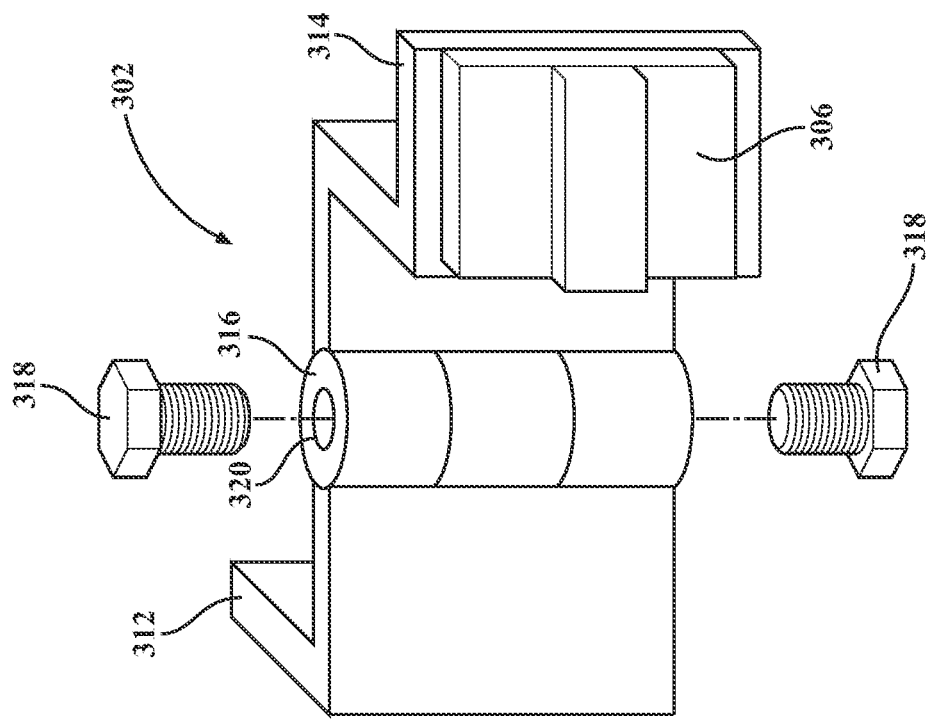
FIG. 38 depicts an exemplary door hinge incorporable into the articulating tailgate assembly, in accordance with aspects of the present invention.

FIG. 38 depicts an exemplary door hinge compatible with slider option for articulation of the first panel 18 for use in FIGS. 32-35 and 44, according to an aspect of the present invention. Further depicted is a plurality of fasteners 318 connected to an aperture 320 of the hinge 316.

Figure 44:
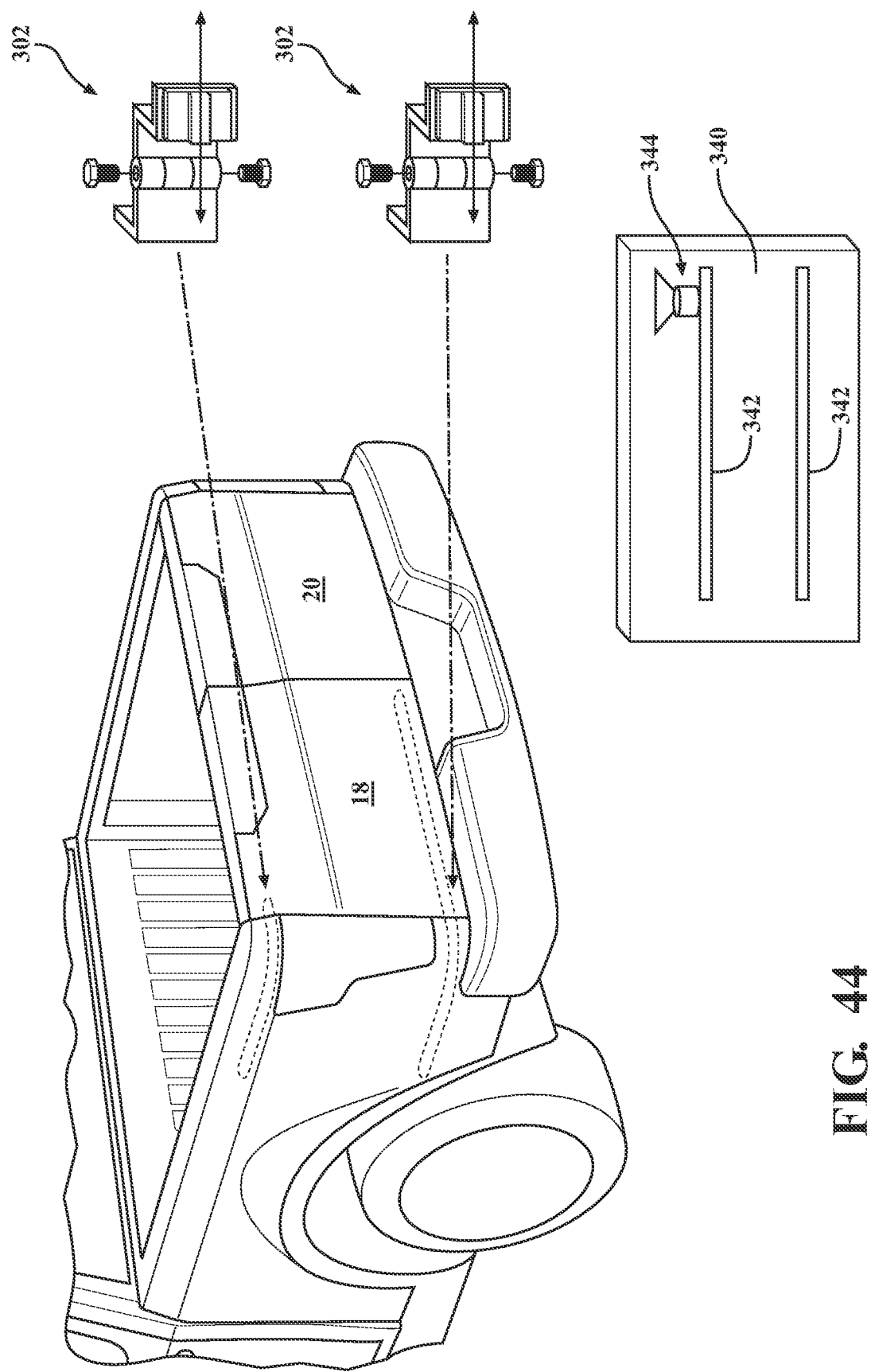
Figure 45:
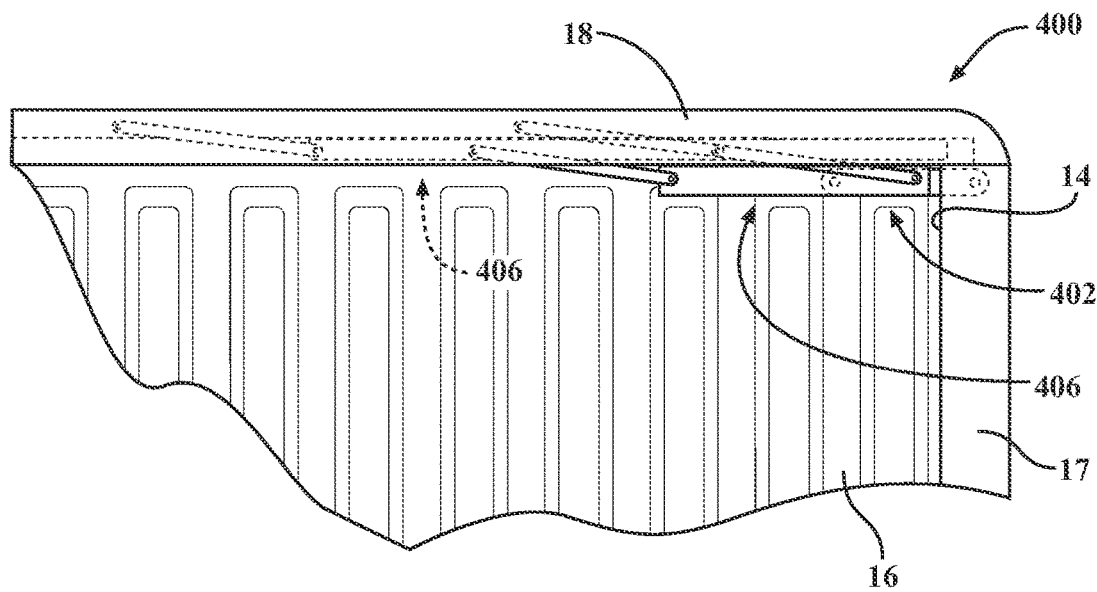
FIGS. 45-50 depict an articulating tailgate assembly incorporating at least one door hinge and a multi bar mechanism, in accordance with aspects of the present invention.
Figure 46:
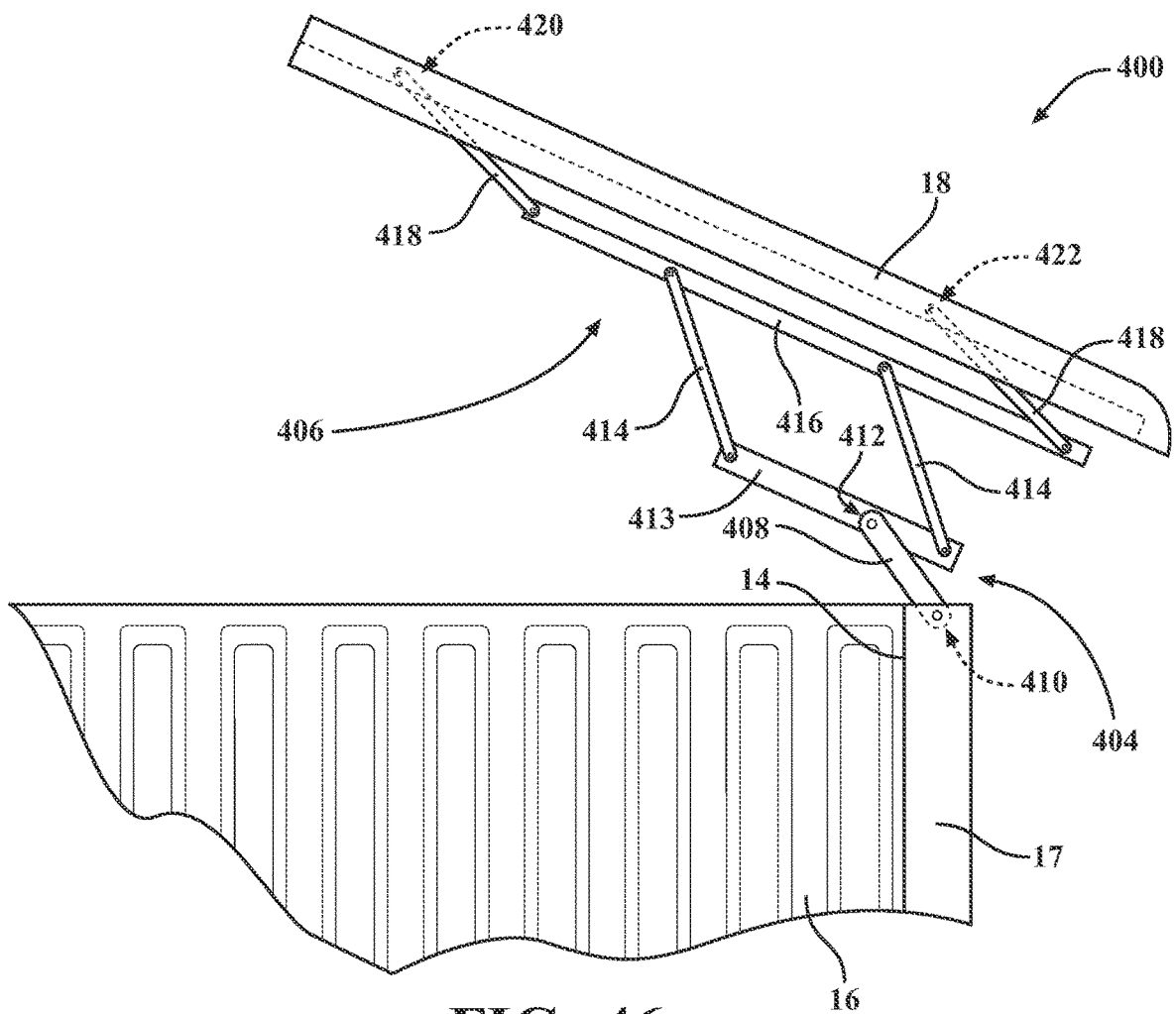
Figure 47:
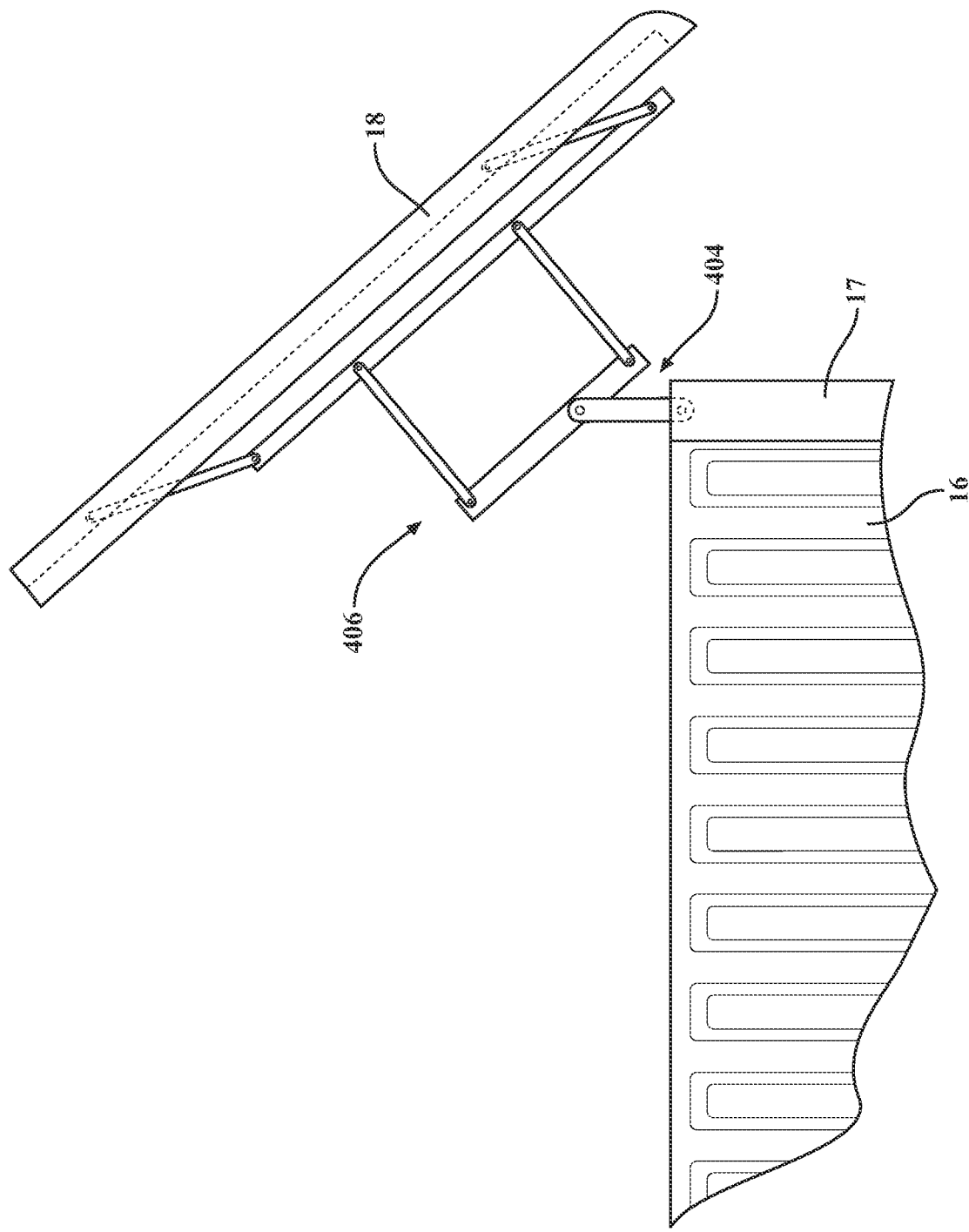
Figure 48:
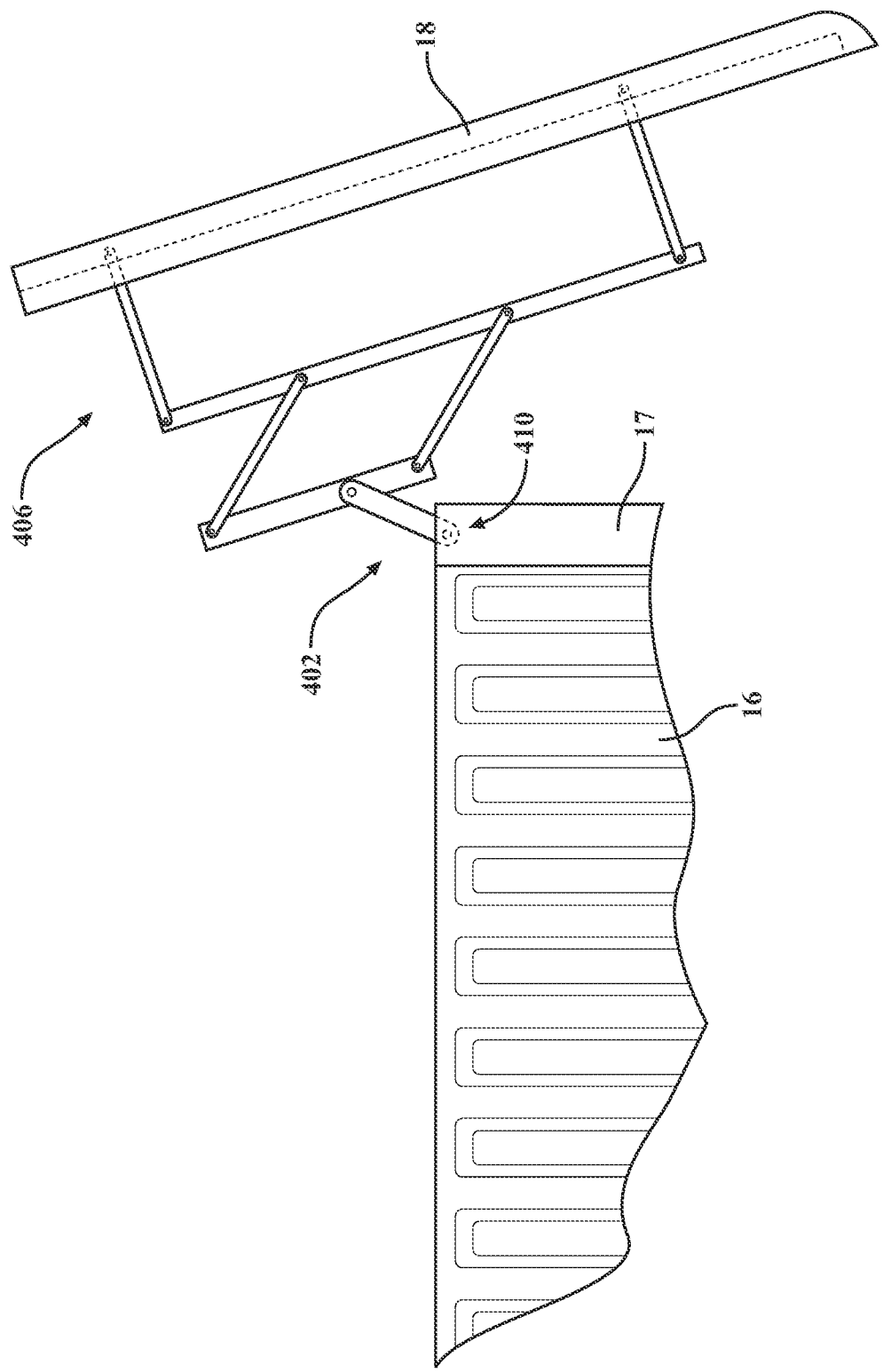
Figure 49:
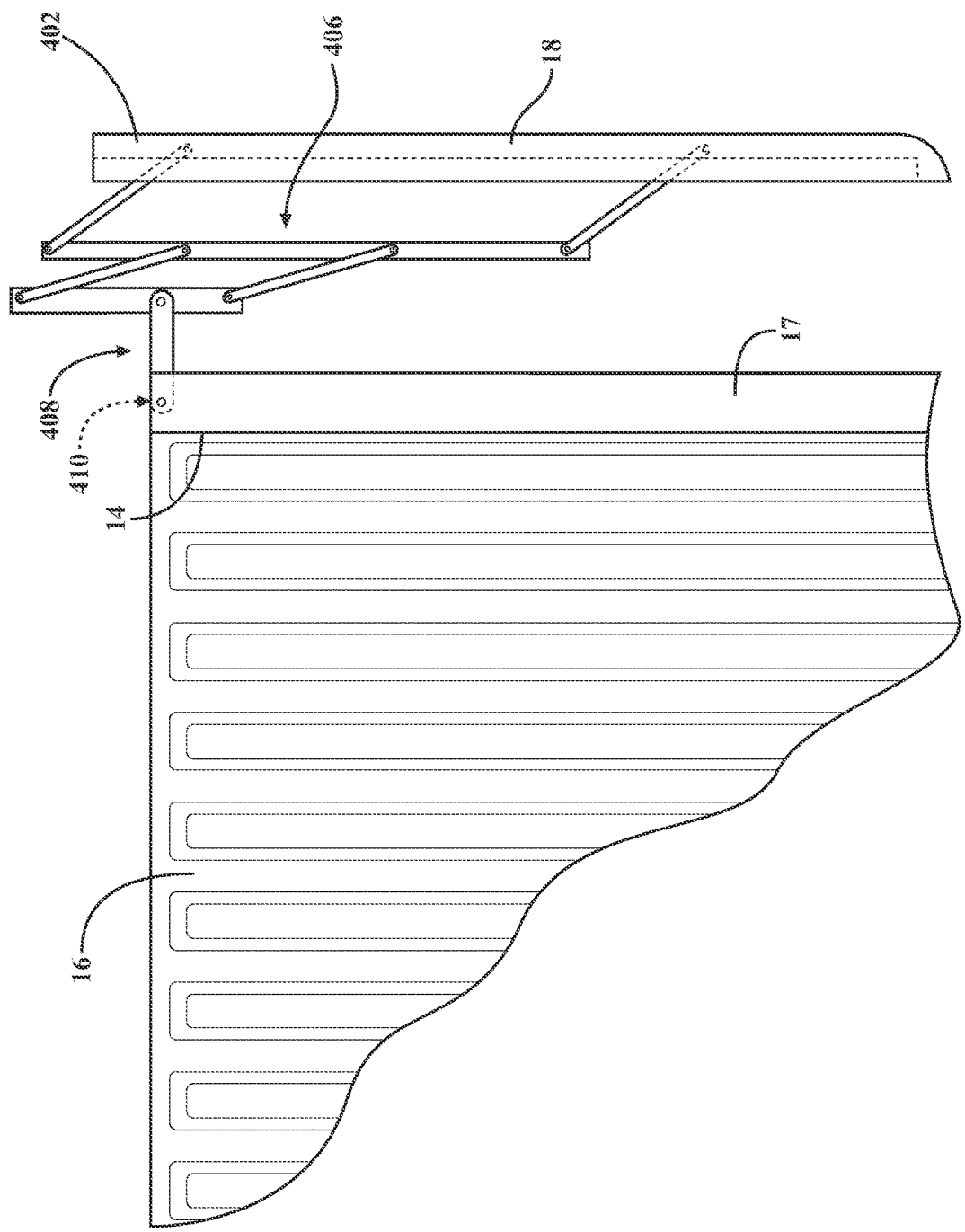

FIG. 44 depicts the articulating liftgate assembly integrating at least a cargo door slider and hinge (e.g., a slider drive incorporating the cargo door slider and a hinge with liner slider overlaid), according to aspects of the present invention. At least one pair of articulating mechanisms 302 (e.g., hinge) are adapted to operably connect to the vehicle and operably couple to the interior face 340 of the first panel 18. At least one cargo door slider roller 344 translates along at least one liner rail (slider) 342 between the open and closed positions of the tailgate panel.

Figure 43:
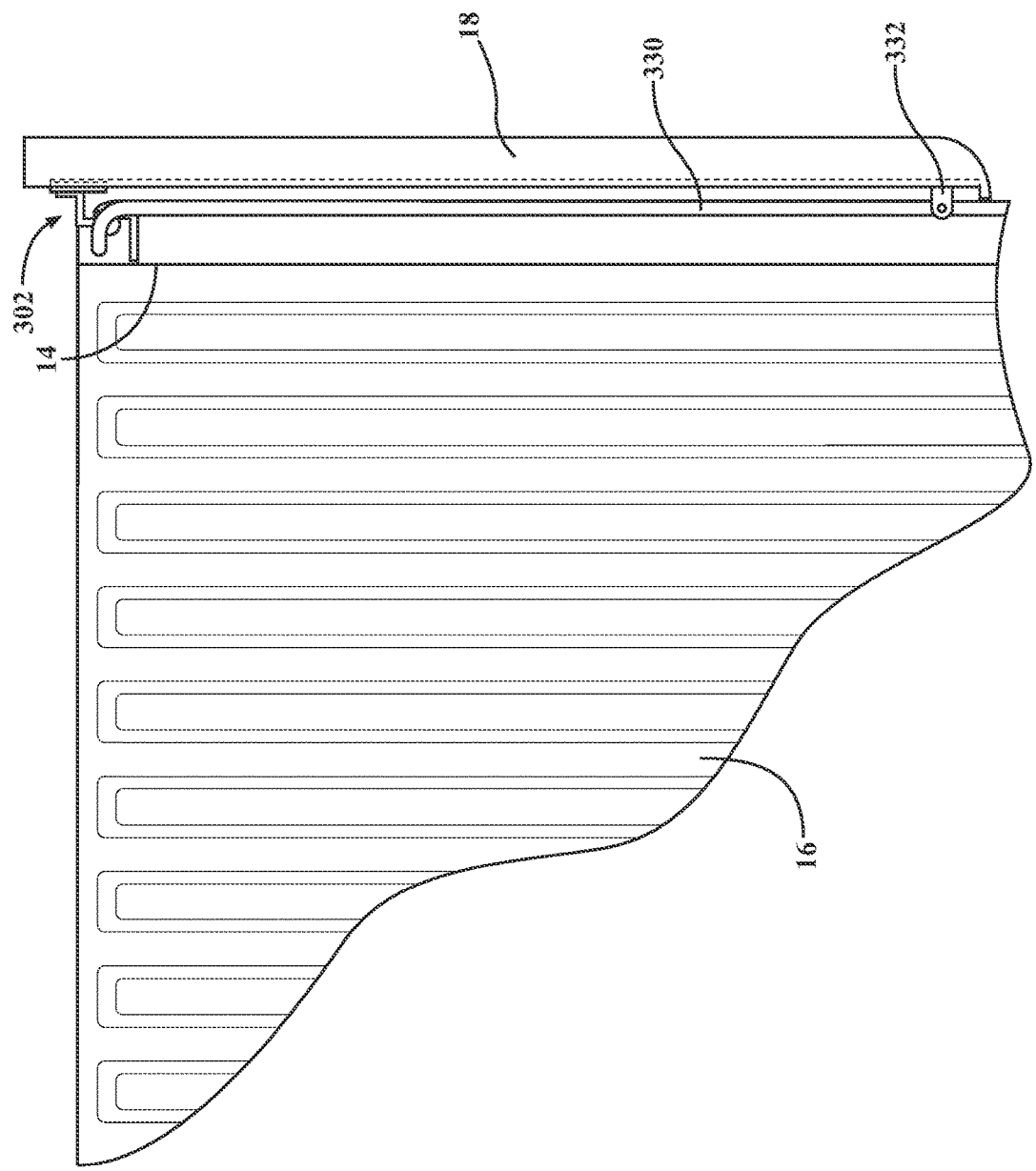

Referring now more particularly to FIGS. 39-43 there is depicted the articulating tailgate assembly with a slider drive incorporating the cargo door slider and a hinge with liner slider overlaid, according to aspects of the present invention, wherein like numbers indicate like parts and the previous descriptions are incorporated here. The assembly 300 incorporates at least one rail 330 that at least one roller 332 (e.g., a cargo door slider—roller) or guide moves along as the door is rotated between the closed (FIG. 39) and open positions (FIG. 43).

Referring now more particularly to FIGS. 45-50 generally, there is depicted an articulating tailgate assembly indicated generally at 400 incorporating at least one hinge and multi-bar mechanism. The assembly 400 includes at least one hinge mechanism, shown generally at 404, and at least one multi-bar mechanism shown generally at 406. The hinge mechanism 404 preferably includes at least one link 408 adapted to rotatably connect to the vehicle 11 (e.g., to cargo bed sidewall 17) at a first pivot joint, shown generally at 410. The link 408 is operably rotatably connected to the linkage assembly 406 at a second pivot joint 412. Preferably, the second joint 412 is provided on a second link 413 of the linkage assembly 406. A first pair of intermediate links 414 are operably rotatably coupled to the second link 413 near one end, and the other ends of the first pair of intermediate links 414 are operably rotatably connected to a third link 416. A second pair of links 418 are operably rotatably connected to the third link 416 near one end, and operably rotatably connected to the first panel 18 near a second end at additional pivot joints 420 and 422.

Figure 50:
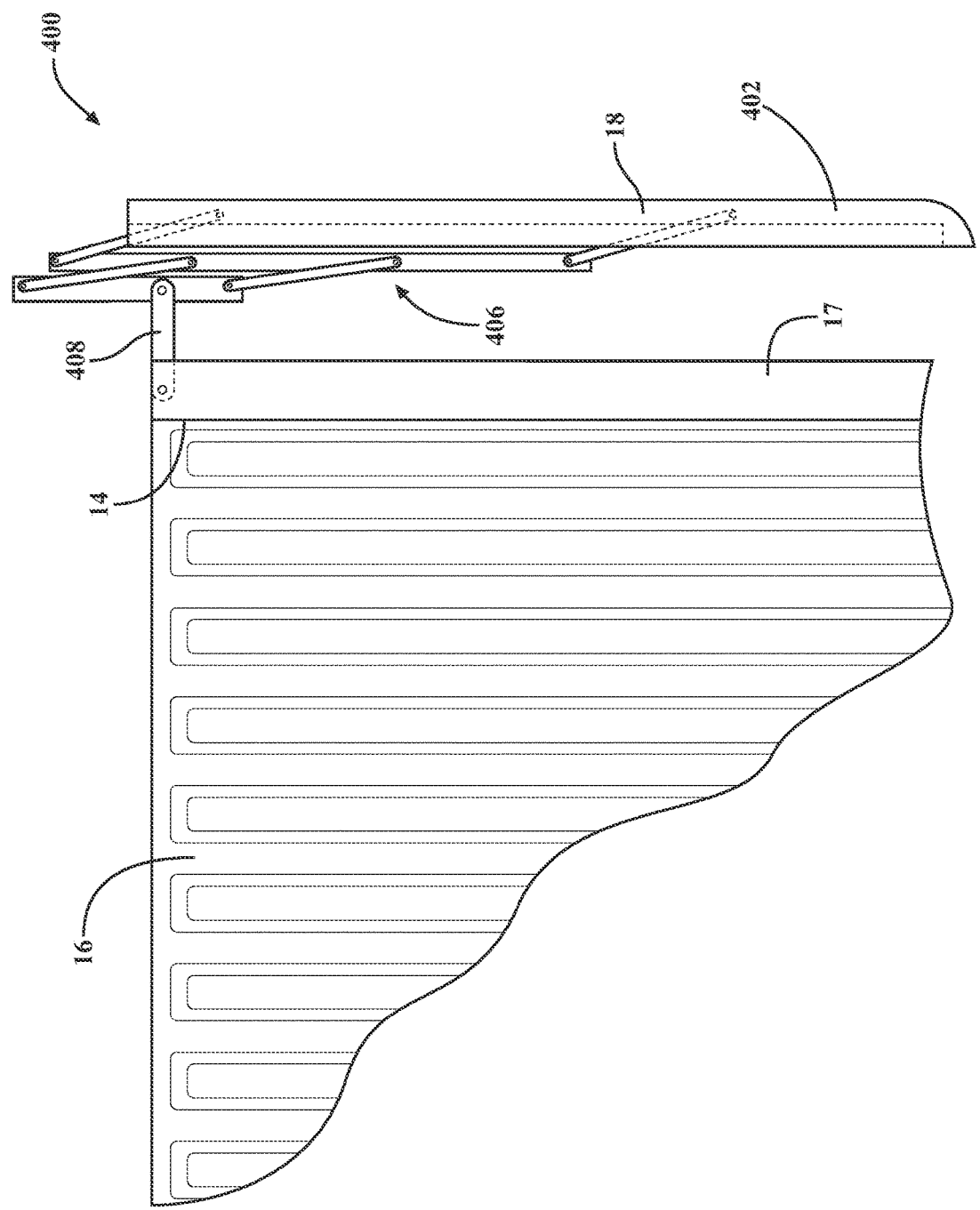
Figure 51:
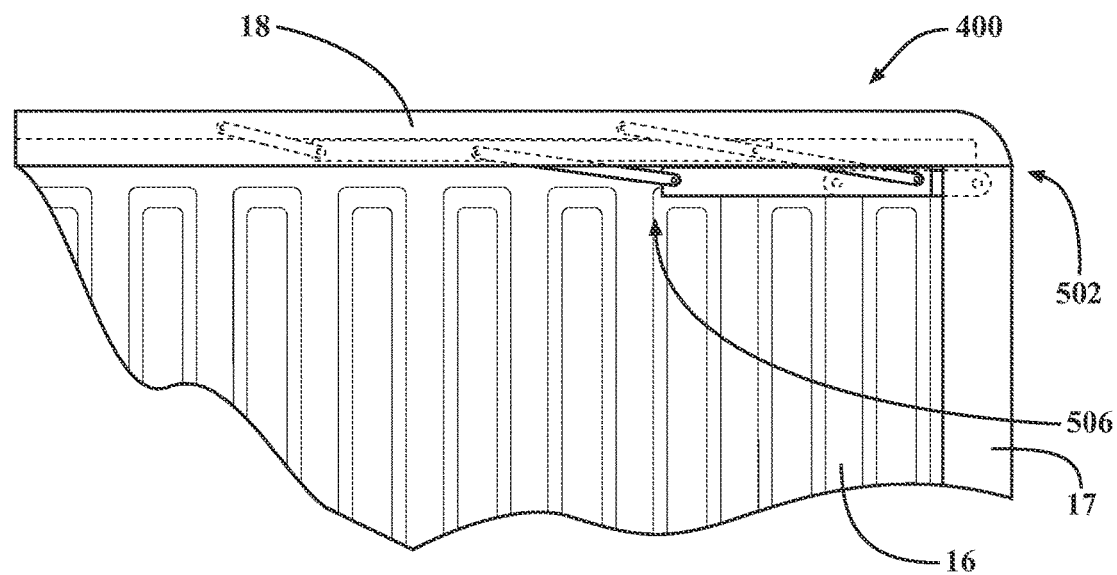
FIGS. 51-55 depict an articulating tailgate assembly incorporating at least one door hinge and 6-bar mechanism, in accordance with aspects of the present invention.
Figure 52:
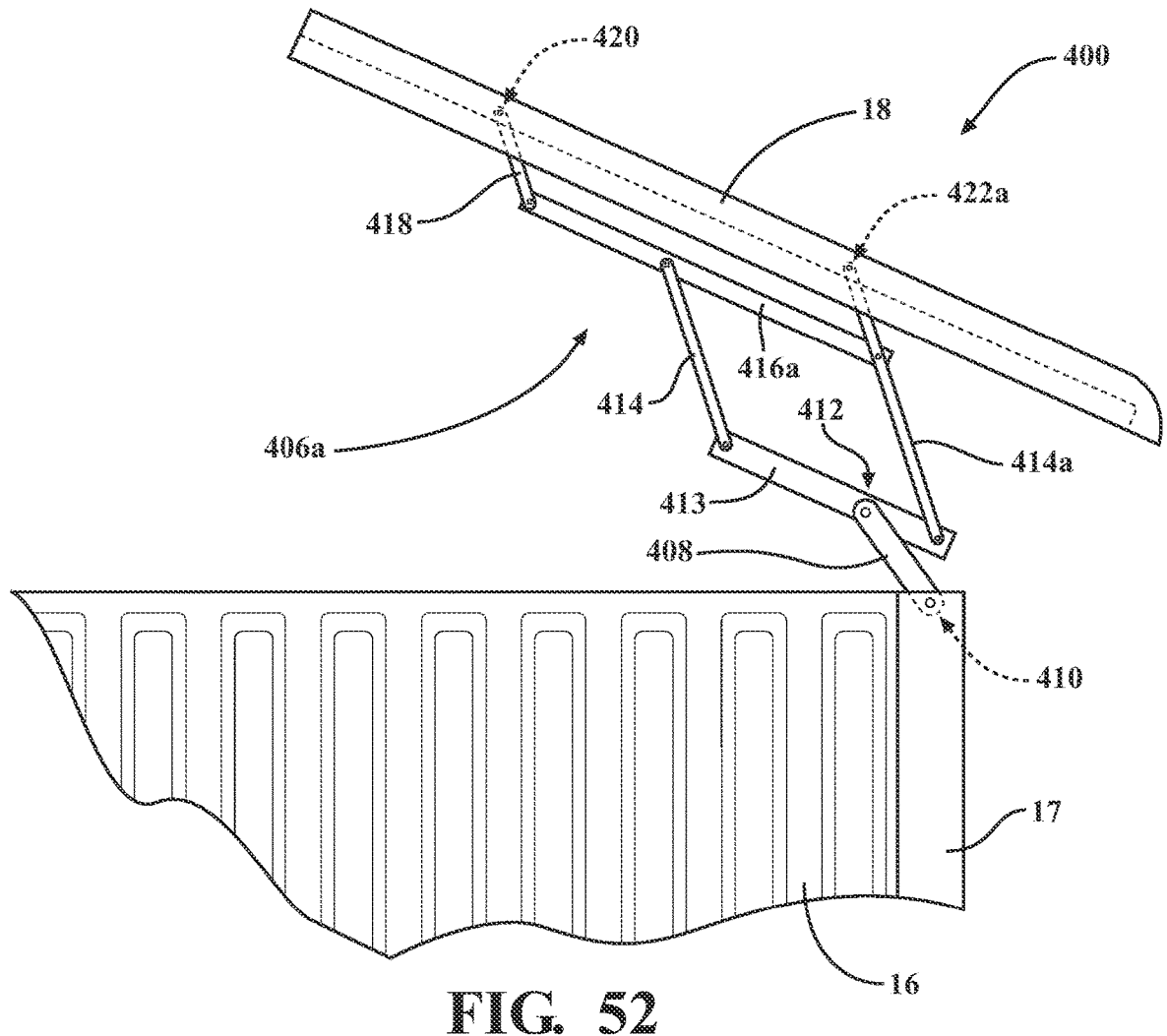
Figure 53:
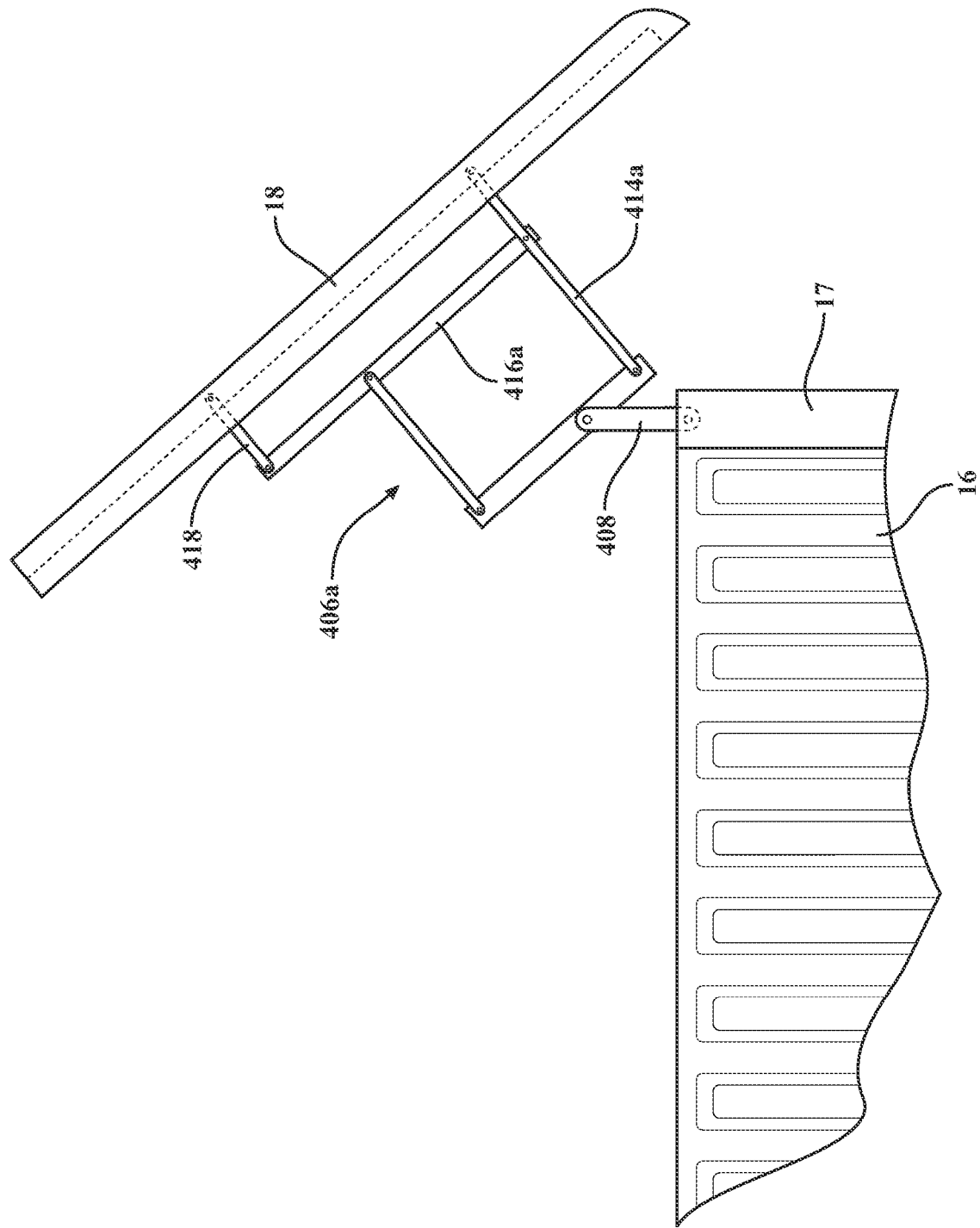
Figure 54:
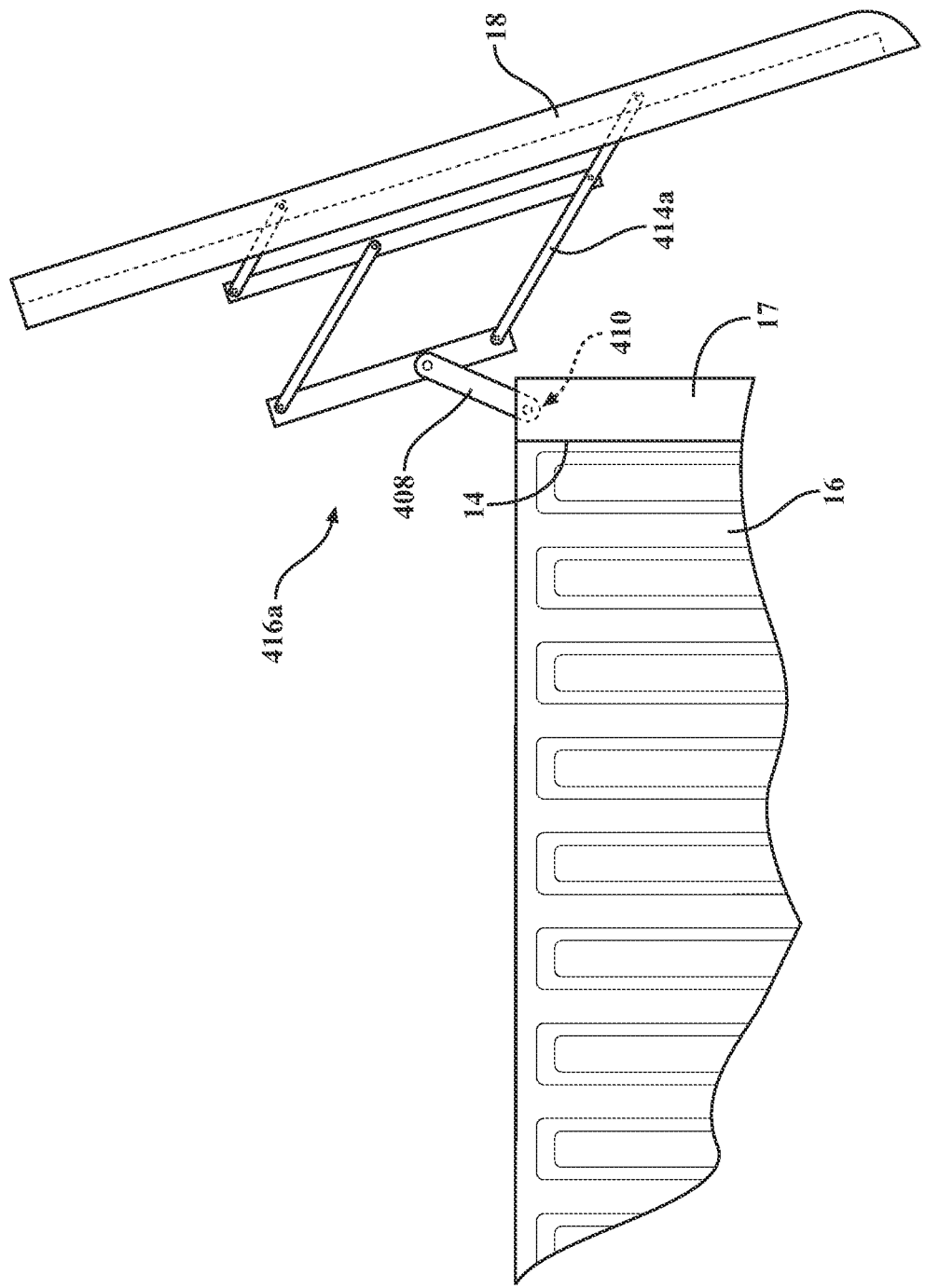

FIGS. 44-50 depict the panel rotating from a closed (FIG. 45) to an exemplary open position (FIG. 50). FIG. 50 is an exemplary fully open position with the first link 404 rotated to a stand-off position from the sidewall 17 and the second linkage assembly 406 rotated and collapsed bringing the first panel 18 to the open position generally alongside the outer surface of the sidewall 17 of the cargo bed 16, thereby increasing access into the rear of the cargo bed.

Referring to FIGS. 1-55 generally, and more particularly to FIGS. 51-55, there is depicted the articulating tailgate assembly indicated generally at 400, wherein like numbers indicate like parts as to FIGS. 45-50, which previous descriptions are incorporated here in entirety. Further depicted in FIGS. 51-55 is an at least one first linkage assembly 406a including an exemplary alternative placement of at least one intermediate link 414a that is rotatably connected to a third link 416a and extends further to operably rotatably connect to the first panel at pivot joint 422a. The linkage assembly 406a is preferably, a 6-bar linkage mechanism.

It is understood that any of FIGS. 1-55 and descriptions and in any combinations is operably adaptable for incorporation with any standard width tailgate or extended width tailgate and rear vehicle space envelope and any tailgate depending on the application without departure from the scope of the present invention.

Referring to FIGS. 1-55 generally, it is understood that the first side tailgate panel assembly (e.g., left side) is substantially a mirror-image of the second side tailgate panel assembly (e.g., right side). The articulating tailgate assembly panels selectively close off the opening of the back of the cargo bed and selectively open to any operator desired intermediate positions and the fully opened position with the panels substantially to the side of both cargo bed sidewalls.

It is understood that any aspects of the FIGS. 1-55 are operably combinable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An articulating tailgate assembly operably adapted for a vehicle, comprising:
    at least two panels operably adapted to selectively close off a rear opening of a cargo bed of the vehicle and operably adapted to selectively move independently of each other to a plurality of open positions;
    a plurality of features for articulating the at least two panels between a closed position and the plurality of open positions, said plurality of features adapted to operably connect to the vehicle at the rear opening area, and operably coupled to the at least two panels, respectively, wherein said plurality of features includes at least two laterally spaced apart pivotal links connected to at least one of an additional pivotal linkage arrangement and a track;
    wherein said at least two panels selectively operably move from a back of the cargo bed where they close off the opening of the cargo bed area to sides of the vehicle to open up access into the cargo bed;
    wherein said at least two panels selectively operably move independently to a plurality of intermediate open positions and to a fully open position at the sides of the vehicle: and
    wherein the at least two panels are tailgate panels, each with a vertical edge that meet in the closed position, the vertical edges face rearward of the vehicle in the fully open position.

2. The articulating tailgate assembly of claim 1, wherein said at least two panels in the closed position meet in a middle of the rear opening and the plurality of features selectively swing the at least two panels outward in opposite directions to the sides of the vehicle to a fully open position.

3. The articulating tailgate assembly of claim 1, wherein said plurality of features are selected from the group consisting of: hinges, tracks, guides, rollers, cargo door track mechanisms, multi-bar slider mechanisms, 6-bar mechanism, linkage assemblies, rotatable links, door hinges, sliders, lead screws, linear sliders and tracks, round linear sliders, door hinges with sliders, cargo door slider rollers, linear rails, and any combinations thereof.

4. The articulating tailgate assembly of claim 1, wherein the [at least two panels are tailgate panels with a] vertical edges [that meet and] are operably secure together in the closed position.

5. The articulating tailgate assembly of claim 1, further comprising at least one selectively operably deployable step with a stepping surface.

6. The articulating tailgate assembly of claim 1, further comprising a plurality of drop down steps adapted to operably rotatably connect in the rear of the vehicle to assist in the ingress and egress in/out of the cargo bed when at least one of the panels is in an open position.

7. The articulating tailgate assembly of claim 1, further comprising at least one lighting device to illuminate at least one predetermined surface or direct light to at least one predetermined direction.

8. The articulating tailgate assembly of claim 1, further comprising a plurality of integrated lights to illuminate the cargo bed interior, a ground surface, and the sides of the vehicle.

9. The articulating tailgate assembly of claim 1, further comprising a plurality of integrated tail lamps into ends of the at least two panels to act as stop lamps when the at least two panels are in open positions.

10. The articulating tailgate assembly of claim 1, wherein both of the at least two panels have an extended width adapted to substantially overlap an end of a respective sidewall of the cargo bed when the panel is in the closed position.

11. The articulating tailgate assembly of claim 1, wherein said at least two panels are selectively operably articulated by the plurality of features in a predetermined small envelope of space that effectively improves access to the cargo bed in a confined space at the rear of the vehicle and reduces the risk of contacting objects behind the vehicle.

12. The articulating tailgate assembly of claim 1, wherein said plurality of features includes at least one cargo door track mechanism for each of said at least two panels.

13. The articulating tailgate assembly of claim 1, wherein said plurality of features includes at least one guide and track arrangement.

14. The articulating tailgate assembly of claim 1, wherein said plurality of features includes at least one rotatable link or hinge and at least one linkage assembly.

15. An articulating tailgate assembly operably adapted to be operably coupled to a cargo bed area of a vehicle, comprising:
    at least two tailgate panels operably adapted to move between a closed position closing off a rear opening of the cargo bed area and a plurality of open positions;
    a plurality of mechanisms adapted to operably connect to the vehicle at the rear opening of the cargo bed area, and operably coupled to and/or incorporated with the at least two tailgate panels, to selectively operably move said at least two tailgate panels wherein said plurality of mechanisms includes at least two laterally spaced apart pivotal links connected to at least one of an additional pivotal linkage arrangement and a track;
    wherein said at least two tailgate panels operably separate and articulate from a back of the cargo bed where they close off the opening of the cargo bed area to outer sides of the cargo bed area to open up access into the cargo bed in a fully open position; and wherein the at least two tailgate panels have vertical edges that meet in the closed position, the vertical edges face rearward of the vehicle when in the fully open position.

16. An articulating tailgate adapted for a pickup truck vehicle having a rear tailgate opening, comprising:
a plurality of tailgate panels adapted to operably couple to the vehicle at the opening,
a plurality of features includes at least two laterally spaced apart pivotal links connected to at least one of an additional pivotal linkage arrangement and a track; said plurality of tailgate panels operably selectively separate and articulate from a back of the vehicle closed position to respective sides of the vehicle in a fully open position, wherein said tailgate panels move out of the way of the opening to provide direct access to a vehicle cargo bed interior through the opening, wherein access distance into the vehicle is thereby reduced at a rear of the vehicle and eliminates any confined access path to the vehicle cargo bed interior, [and] wherein said plurality of tailgate panels articulate in a predetermined confined amount of space to reduce the risk of contacting objects behind the vehicle, wherein the tailgate panels have vertical edges that meet in the closed position, the vertical edges face rearward of the vehicle when in the fully open position.

17. The articulating tailgate assembly of claim 15, wherein said plurality of mechanisms includes at least one multi-bar mechanism and at least one track or rail arrangement.

18. The articulating tailgate assembly of claim 17, wherein said multi-bar mechanism is a 4-bar slider mechanism.

19. The articulating tailgate assembly of claim 17, wherein said multi-bar mechanism is a 6-bar linkage mechanism.

20. The articulating tailgate assembly of claim 17, wherein said multi-bar mechanism is slidable and/or rotatable.

21. The articulating tailgate assembly of claim 17, wherein said multi-bar mechanism operably incorporates at least one rotatable link or hinge and at least one linkage assembly.

* * * * *